United States Patent
Ohta et al.

(10) Patent No.: US 9,408,192 B2
(45) Date of Patent: Aug. 2, 2016

(54) RADIO COMMUNICATION SYSTEM, MOBILE STATION, BASE STATION, AND METHOD FOR CONTROLLING RADIO COMMUNICATION SYSTEM

(71) Applicant: FUJITSU LIMITED, Kawasaki-shi, Kanagawa (JP)

(72) Inventors: Yoshiaki Ohta, Yokohama (JP); Yoshihiro Kawasaki, Kawasaki (JP); Yoshiharu Tajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 4 days.

(21) Appl. No.: 14/226,843

(22) Filed: Mar. 27, 2014

(65) Prior Publication Data

US 2014/0206375 A1 Jul. 24, 2014

Related U.S. Application Data

(63) Continuation of application No. PCT/JP2011/072674, filed on Sep. 30, 2011.

(51) Int. Cl.
*H04W 72/04* (2009.01)
*H04W 72/08* (2009.01)

(52) U.S. Cl.
CPC .......... *H04W 72/0406* (2013.01); *H04W 72/08* (2013.01)

(58) Field of Classification Search
CPC ............................. H04L 1/1854; H04W 72/04
See application file for complete search history.

(56) References Cited

U.S. PATENT DOCUMENTS

| 2006/0072510 | A1 | 4/2006 | Aizawa |
| 2008/0232315 | A1* | 9/2008 | Bachl ................. H04W 72/1278 370/329 |
| 2009/0232309 | A1* | 9/2009 | Montojo et al. .............. 380/270 |
| 2010/0150128 | A1* | 6/2010 | Brisebois et al. ............. 370/343 |
| 2010/0210256 | A1* | 8/2010 | Shen et al. .................. 455/422.1 |
| 2011/0064115 | A1* | 3/2011 | Xu et al. ....................... 375/130 |
| 2014/0092881 | A1 | 4/2014 | Akimoto et al. |

FOREIGN PATENT DOCUMENTS

| JP | 2005-57391 | 3/2005 |
| JP | 2009-165131 | 7/2009 |
| JP | 2010-518765 | 5/2010 |
| JP | 2010-220036 | 9/2010 |
| JP | 2010-251887 | 11/2010 |

(Continued)

OTHER PUBLICATIONS

Panasonic; "Scheduling aspects for carrier aggregation", 3GPP TSG RAN WG2 #68 R2-096486. Nov. 9-13, 2009.

(Continued)

*Primary Examiner* — Khalid Shaheed
*Assistant Examiner* — Ernest Tacsik
(74) *Attorney, Agent, or Firm* — Fujitsu Patent Center

(57) ABSTRACT

A radio communication system includes a base station and a mobile station. The base station includes a controller that changes communication configurations when a plurality of communications with the mobile station at respective periodic communication intervals are scheduled to occur at the same communication timing so as to control to resolve simultaneous communications. The mobile station comprises a controller that performs communications with the base station using the communication configurations changed by the controller in the base station.

13 Claims, 18 Drawing Sheets

(56) References Cited

FOREIGN PATENT DOCUMENTS

| | | |
|---|---|---|
| JP | 2011-172019 | 9/2011 |
| WO | 2008-098352 | 8/2008 |
| WO | 2009/041419 A1 | 4/2009 |
| WO | 2011/036937 A1 | 3/2011 |
| WO | 2011/115421 A2 | 9/2011 |

OTHER PUBLICATIONS

CATT, CMCC, Qualcomm Europe; "Multiple patterns for UL SPS", 3GPP TSG RAN WG2 #63 R2-084841. Aug. 18-22, 2008.

3GPP TR 36.913, v9.0.0; "Requirements for further advancements for Evolved Universal Terrestrial Radio Access (E-UTRA) (LTE-Advanced)" (Release 9). Dec. 2009.

3GPP TR36.912, v9.3.0; "Feasibility study for Further Advancements for E-UTRA (LTE-Advanced)" (Release 9). Jun. 2010.

3GPP TS36.300, v10.4.0; "Evolved Universal Terrestrial Radio Access (E-UTRA) and Evolved Universal Terrestrial Radio Access Network (E-UTRAN)" (Release 10). Jun. 2011.

3GPP TS36.321, v10.2.0; "Medium Access Control (MAC) protocol specification" (Release 10). Jun. 2011.

International Search Report, mailed in connection with PCT/JP2011/072674 and mailed Jan. 10, 2012.

JPOA—Office Action of Japanese Patent Application No. 2013-535805 mailed Aug. 18, 2015, with English translation of the relevant part, p. 1, line 28 to line 29; p. 2, line 6 to line 34, line 38 to line 41, line 44 to line 49, line 52 to line 55; p. 3, line 3 to line 8, line 12 to line 19, line 28 to line 41.

\* cited by examiner

RADIO COMMUNICATION SYSTEM, MOBILE STATION, BASE STATION, AND METHOD FOR CONTROLLING RADIO COMMUNICATION SYSTEM

CROSS-REFERENCE TO RELATED APPLICATION

This application is a continuation of International Application No. PCT/JP2011/072674, filed on Sep. 30, 2011, the entire contents of which are incorporated herein by reference.

FIELD

The embodiments discussed herein are directed to a radio communication system, a mobile station, a base station, and a method for controlling a radio communication system.

BACKGROUND

In recent years, cellular mobile communications have evolved from the Universal Mobile Telecommunication System (UMTS) to the Long Term Evolution (LTE). The LTE uses the Orthogonal Frequency Division Multiplexing (OFDM) as a basis of its radio access technology, to achieve high-speed radio packet communications with a downlink peak transmission rate of 100 megabits per second or higher, and an uplink peak transmission rate of 50 megabits per second or higher. The Third Generation Partnership Project (3GPP), which is an international standardization organization, has started developing LTE-Advanced (LTE-A), which is a standard for a mobile communication system based on the LTE, to achieve communications at even higher rates.

The LTE and the LTE-A both specify two different data reception scheduling algorithms, the dynamic scheduling (DS) and the semi-persistent scheduling (SPS). In the DS designates radio resources are indicated by a physical downlink control channel (PDCCH) to both uplink communications and downlink communications, and a physical downlink shared channel (PDSCH) representing data is transmitted using the indicated parameters.

In the SPS, a predetermined period having a particular transmission interval is notified in advance, before actual communications take place. When a communication using the SPS (hereinafter, referred to as an "SPS communication") is to take place, the base station initiates the communication by transmitting an activation command on the PDCCH, to notify which radio resources are to be used continuously to a mobile station. For example, for a VoIP communication in which a first transmission of data occurs in every 20 milliseconds, a transmission interval of 20 milliseconds is signaled via radio resource control (RRC). When the actual communication is then to take place, a PDCCH activation command is used to indicate which radio resources are to be used, and an SPS communication at a 20 millisecond interval is initiated from that subframe. Because a transmission interval and radio resources are notified in advance, it is not necessary to transmit a downlink (DL) assignment and an uplink (UL) assignment (UL grant) over the PDCCH at each of the SPS intervals. Therefore, with the SPS communication, when the data packet size is small, only the data needs to be transmitted via the PDSCH, and no PDCCH is associated with the PDSCH that are small data. Therefore, the PDCCH signaling overhead can be reduced. The DS is used in data retransmissions, by contrast. When the SPS communication is completed, the base station transmits a release command via a PDCCH to the mobile station, or performs null transmissions for the number of times specified in a parameter called implicitReleaseAfter, to end the execution of the SPS communication. Specifically, the allocated radio resources are no longer used, while the SPS communication interval is still maintained. When an SPS communication is to be restarted, an activation command via a PDCCH is transmitted again to indicate the radio resources to be used. An SPS-like communication can be also achieved with the DS. For example, an SPS-like communication is achieved by causing a base station to perform a DS-based communication at an interval of 20 milliseconds. However, when the SPS-like communication is performed using the DS, the PDCCH signaling overhead is increased.

Japanese Laid-open Patent Publication No. 2009-165131 discloses a conventional technology that controls whether the radio resources are kept active or caused to transit to sleep after a scheduled period is completed based on the presence of transmission data when signals are received intermittently, e.g., in the case of SPS communications. Japanese National Publication of International Patent Application No. 2010-518765 discloses a technology that recovers synchronization when the timing of intermittent receptions between a base station and a mobile station are desynchronized, by signaling desynchronized discontinuous reception (DRX) timing. Other examples of related art are disclosed in: 3GPP TR 36.913, "Requirements for further advancements for Evolved Universal Terrestrial Radio Access (E-UTRA) (LTE-Advanced)", V9.0.0, Release 9, December 2009; 3GPP TR36.912, "Feasibility study for further advancements for E-UTRA (LTE-Advanced)", V9.3.0, Release 9, June 2010; 3GPP TS36.300, "Evolved Universal Terrestrial Radio Access (E-UTRA) and Evolved Universal Terrestrial Radio Access Network (E-UTRAN)", V10.4.0, Release 10, June 2011; and 3GPP TS36.321, "Medium Access Control (MAC) protocol specification", V10.2.0, Release 10, June 2011.

However, when SPS communications at different communication intervals are configured to communications between a base station and a mobile station, two of the SPS communications might occur at the same timing. To address this issue, the LTE and the LTE-A specify that only one piece of data, more exactly, only one transport block can be transmitted within one subframe, unless multiple input multiple output (MIMO) transmissions are configured. Therefore, there is a possibility that one of the SPS communications might not be able to be continued.

When multiple SPS communications occur at the same timing even with the conventional technology for controlling whether the radio resources are to be kept active or caused to transit to sleep after a scheduled period is completed, or with the conventional technology for recovering synchronization, the SPS communications might not be able to be continued.

SUMMARY

According to an aspect of an embodiment, a radio communication system includes a base station; and a mobile station. The base station includes a control unit that changes communication configurations when a plurality of communications with the mobile station at respective periodic communication intervals are scheduled to occur at a same communication timing so as to control to resolve simultaneous communications. The mobile station includes a communication control unit that performs communications with the base station using the communication configurations changed by the control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments disclosed hereunder are not intended to limit the scope of the radio communication system, the mobile station, the base station, and the method for controlling a radio communication system according to the present invention in any way.

[a] First Embodiment

Figure 1:
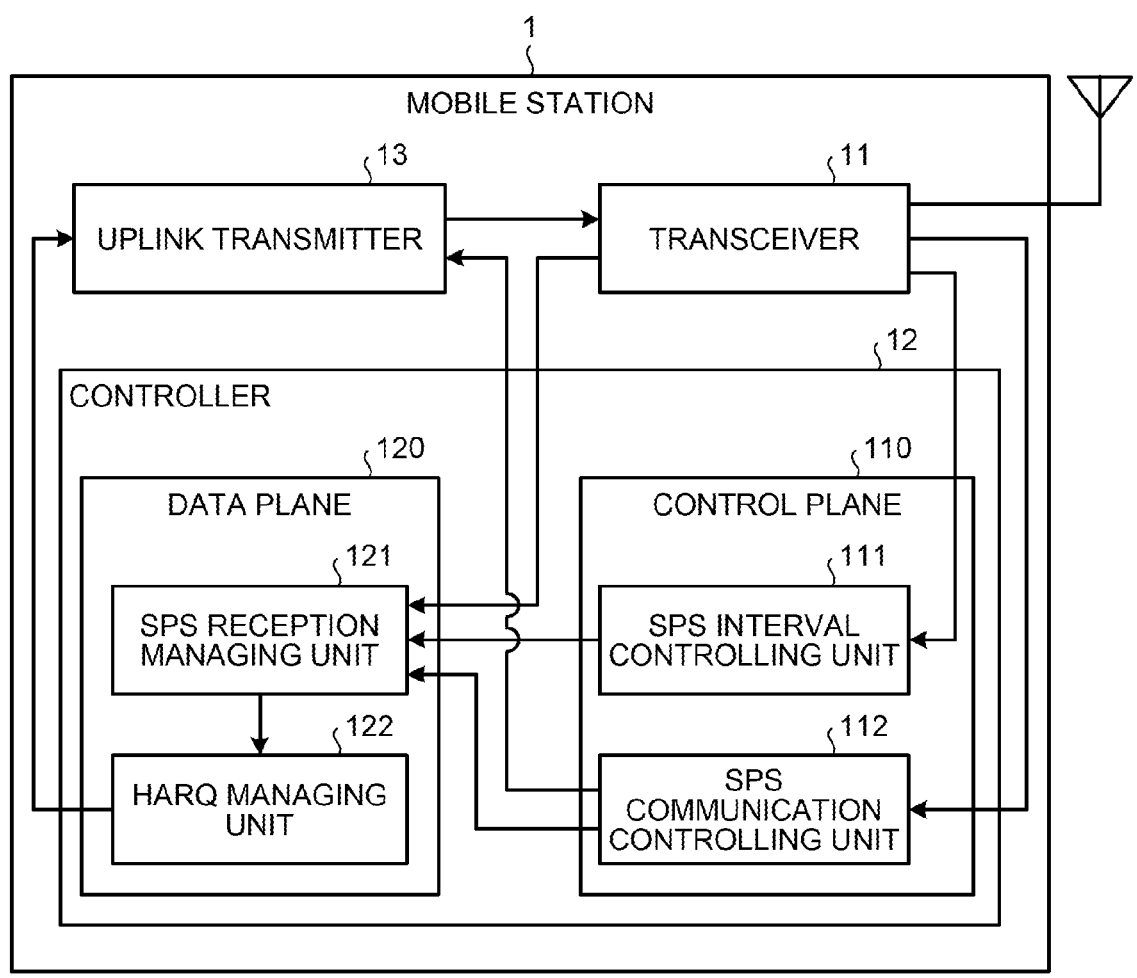
FIG. 1 is a block diagram of a mobile station according to a first embodiment of the present invention.
Figure 2:
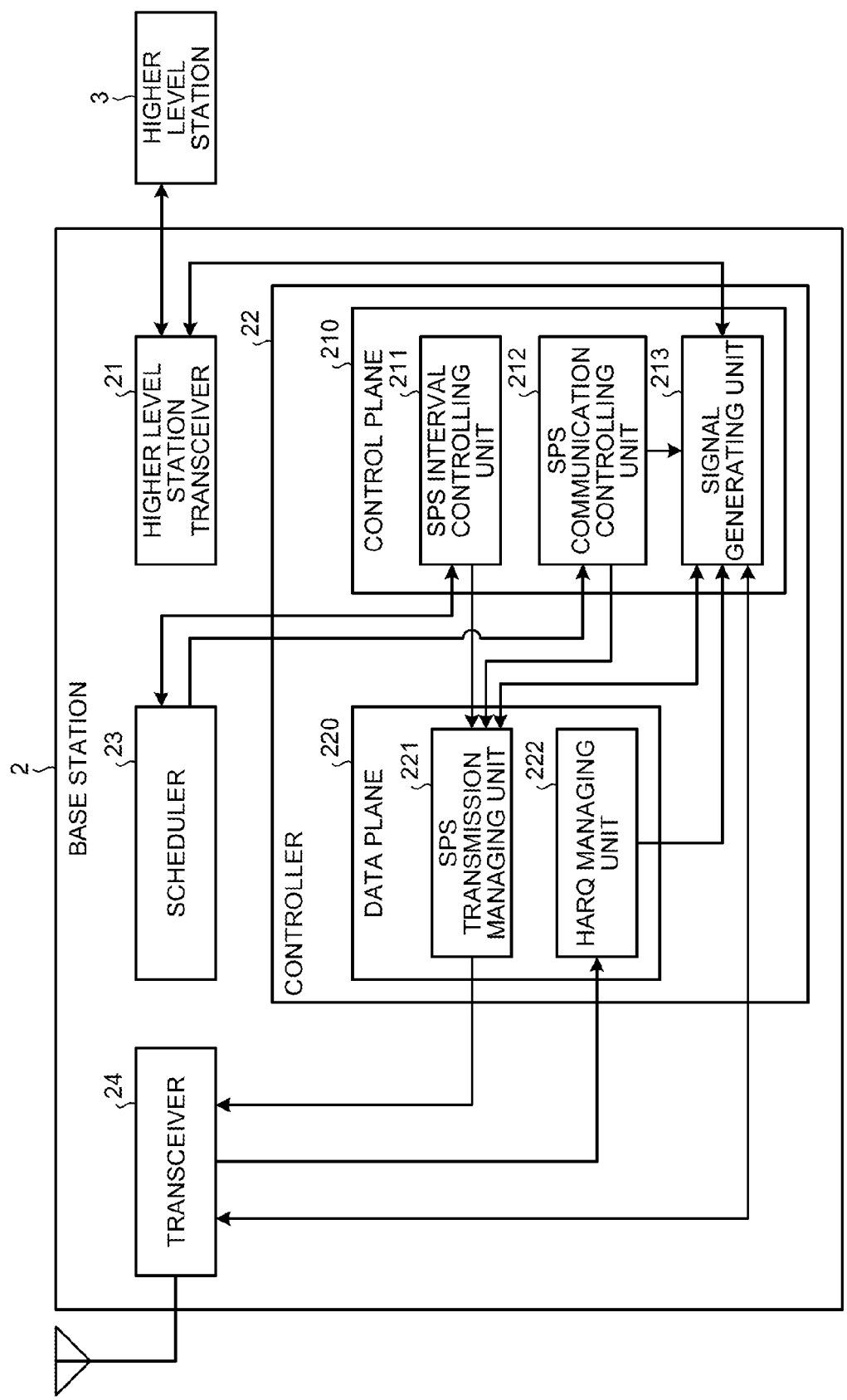
FIG. 2 is a block diagram of a base station according to the first embodiment.

FIG. 1 is a block diagram of a mobile station according to a first embodiment of the present invention. FIG. 2 is a block diagram of a base station according to the first embodiment.

As illustrated in FIG. 1, a mobile station 1 according to the first embodiment includes a transceiver 11, a controller 12, and an uplink transmitter 13. The controller 12 includes a control plane 110 and a data plane 120. The control plane 110 includes an SPS interval controlling unit 111 and an SPS communication controlling unit 112. The data plane 120 includes an SPS reception managing unit 121 and a hybrid automatic repeat request (HARQ) managing unit 122.

The transceiver 11 transmits and receives radio signals to and from a base station 2 described later, via an antenna. The transceiver 11 receives radio resource control (RRC) signaling, which is a layer-three control signal for signaling communication configurations, from the base station 2. The communication configurations notified via the RRC signaling include a notification of a periodic communication interval used in an SPS communication. In the first embodiment, the RRC signaling also includes the timing at which a PDCCH for instructing activation of an SPS communication and the timing at which a PDCCH for instructing release of the SPS communication are received. These pieces of information are timing information for indicating by how much the timings for receiving pieces of data are shifted forwardly or backwardly when SPS communications are scheduled to occur at the same timing, but are not information for notifying the timing at which an SPS communication is to be activated and released when an SPS communication is initiated. The way in which the reception timings are shifted is not limited thereto, and the timing may be shifted by notifying how the timings are shifted via notifying information, or by preparing a specification describing the way in which the timings are shifted in advance.

The PDCCH for instructing activation of an SPS communication includes an activation command, and may be hereinafter referred to as an "activation PDCCH". The PDCCH for instructing release of an SPS communication includes a release command, and may be hereinafter referred to as a "release PDCCH". The transceiver 11 acquires a communication interval for an SPS communication from the received RRC signaling, and transmits the timing to the SPS interval controlling unit 111. In the first embodiment, because a plurality of SPS communications take place between the mobile station 1 and the base station 2, the transceiver 11 receives periodic intervals for the respective SPS communications via the RRC signaling, and transmits the communication intervals to the SPS interval controlling unit 111. The transceiver 11 also acquires the timings at which the activation PDCCH is received and the release PDCCH is received from the received RRC signaling, and transmits the timings to the SPS communication controlling unit 112.

The transceiver 11 also acquires communication timings having shifted by the base station 2 from the RRC. The communication timings having shifted by the base station 2 herein mean communication timings that are determined by the base station 2 by shifting communication timings for the respective SPS communications when the SPS communications are scheduled to occur at the same timing. The way in which the base station 2 modifies the communication timings will be explained later in detail. The transceiver 11 then notifies the SPS communication controlling unit 112 of the communication timings having shifted by the base station 2.

The transceiver 11 also receives the activation PDCCH or the release PDCCH from the base station 2 via the antenna. The transceiver 11 then transmits the activation PDCCH or the release PDCCH to the SPS communication controlling unit 112.

The transceiver 11 also receives data in an SPS communication (hereinafter, referred to as "SPS data") from the base station 2. The transceiver 11 outputs the received data to the SPS reception managing unit 121.

The transceiver 11 also receives an input of Negative ACKnowledgement (NACK) from the uplink transmitter 13. The transceiver 11 then transmits the received NACK to the base station 2 via the antenna.

The SPS interval controlling unit 111 manages periodic communication intervals for a plurality of respective SPS communications. Each of the SPS communications represents an example of a "communication". The SPS interval controlling unit 111 receives respective periodic communication intervals for a plurality of SPS communications from the transceiver 11. The SPS interval controlling unit 111 then separates the periodic communication intervals for the respective SPS communications, and generates separate schedules at the respective communication intervals. The SPS interval controlling unit 111 then notifies the SPS reception managing unit 121 of the schedules of the respective periodic communication intervals for the respective SPS communications.

The SPS communication controlling unit 112 controls radio resources and the timings at which the PDCCH is received for the respective SPS communications. The SPS communication controlling unit 112 acquires the timing of reception of the activation PDCCH, the timing of reception of the release PDCCH, and communication timings having shifted from the transceiver 11. The SPS communication controlling unit 112 also receives activation received PDCCH from the transceiver 11.

The SPS communication controlling unit 112 identifies the timing of the PDCCH reception corresponding to each of the SPS communications from the received PDCCH reception timings. The SPS communication controlling unit 112 receives the activation PDCCH from the transceiver 11 at the timing of activation PDCCH reception notified via RRC signaling, and checks for an activation command. The SPS communication controlling unit 112 also acquires the radio resources such as a frequency, time, and an encoding scheme to be used in the SPS communication from the activation PDCCH. After checking the activation command, the SPS communication controlling unit 112 instructs the SPS reception managing unit 121 to activate an SPS communication. At this time, the SPS communication controlling unit 112 also notifies the SPS reception managing unit 121 of the radio resources to be used in the SPS communication. The SPS communication controlling unit 112 also receives the release PDCCH from the transceiver 11 at the release PDCCH reception timing notified via the RRC signaling, and checks for a release command. After checking the release command, the SPS communication controlling unit 112 instructs the SPS reception managing unit 121 to release the configurations of the SPS communication. The SPS communication controlling unit 112 also instructs the SPS reception managing unit 121 to receive data at the shifted communication timings.

The SPS communication controlling unit 112 also notifies the uplink transmitter 13 of the radio resources to be used in transmitting data to the base station 2. The SPS communication controlling unit 112 gives activation commands and release commands for the respective SPS communications to the SPS reception managing unit 121. The SPS communication controlling unit 112 represents an example of a "configuration controlling unit".

The SPS reception managing unit 121 receives schedules each at a periodic communication interval for the corresponding SPS communication from the SPS interval controlling unit 111. The SPS reception managing unit 121 also receives an activation command from the SPS communication controlling unit 112 before an SPS communication is initiated. At this time, the SPS reception managing unit 121 also receives a notification of radio resources to be used in the SPS communication from the SPS communication controlling unit 112. Upon receiving the activation command, the SPS reception managing unit 121 activates the SPS communication using the notified radio resources. After activating the SPS communication, the SPS reception managing unit 121 receives data over the SPS communication from the transceiver 11 following the schedule of the communication timings for the SPS communication received from the SPS interval controlling unit 111. After processing the received data in each layer including medium access control (MAC), radio link control (RLC), and packet data convergence protocol (PDCP), the SPS reception managing unit 121 provides the received data to a user.

When the SPS reception managing unit 121 receives a release command from the SPS communication controlling unit 112 while the SPS communication is being executed, the SPS reception managing unit 121 deactivates the SPS communication. The SPS reception managing unit 121 then switches the communication configuration to the DS. The SPS reception managing unit 121 then receives data including a PDCCH and a PDSCH from the base station 2 via the transceiver 11, at the communication timing notified by an SPS communication controlling unit 212. The SPS reception managing unit 121 acquires a control command from the PDCCH in the received data, and processes the PDSCH in accordance with the control command. The SPS reception managing unit 121 then provides a processed signal to an operator.

When the SPS reception managing unit 121 receives an activation command from the SPS communication controlling unit 112 while configured with the DS communication, the SPS reception managing unit 121 re-activates the SPS communication. Data is then received via an SPS communication and provided to the operator, in the same manner as before the SPS communication is released.

Because a DS communication is initiated when a release command is received, the SPS reception managing unit 121 can shift the timing of one communication from another communication timing that is scheduled to occur at the same timing, based on an instruction from the base station 2. In this manner, the mobile station 1 can resolve simultaneous communications among a plurality of SPS communications, so that the mobile station 1 can receive all of the data in the SPS communications.

The SPS reception managing unit 121 also outputs the processing result of the received data to the HARQ managing unit 122. The SPS reception managing unit 121 represents an example of a "data transceiving unit".

The HARQ managing unit 122 manages data retransmissions. The HARQ managing unit 122 acquires data processing result from the SPS reception managing unit 121. If a data reception error is detected based on the received processing result, the HARQ managing unit 122 instructs the uplink transmitter 13 to request a retransmission of the data.

The uplink transmitter 13 receives the data retransmission request from the HARQ managing unit 122. The uplink transmitter 13 then transmits a NACK to the base station 2 using the radio resources notified by the SPS communication controlling unit 112 via the transceiver 11.

As illustrated in FIG. 2, the base station 2 according to the first embodiment includes a higher level station transceiver 21, a controller 22, a scheduler 23, and a transceiver 24. The controller 22 includes a control plane 210 and a data plane 220. The control plane 210 includes an SPS interval controlling unit 211, the SPS communication controlling unit 212, and a signal generating unit 213. The data plane 220 includes an SPS transmission managing unit 221 and an HARQ managing unit 222. The base station 2 is connected to a higher level station 3 over a network.

The higher level station transceiver 21 exchanges data with the higher level station 3 over the network. The higher level station transceiver 21 outputs data received from the higher level station 3 to the signal generating unit 213. The higher level station transceiver 21 also receives data from the signal generating unit 213. The higher level station transceiver 21 then transmits the received data to the higher level station 3.

The transceiver 24 exchanges data with the mobile station 1 over radio signals. For example, the transceiver 24 receives data including an activation PDCCH and a release PDCCH, and data for an SPS communication from the SPS transmission managing unit 221, and transmits the data to the mobile station 1 via the antenna. The transceiver 24 also receives RRC signaling and the like from the signal generating unit 213, and transmits the RRC signaling and the like to the mobile station 1 via the antenna. The transceiver 24 also outputs a NACK received from the mobile station 1 to the HARQ managing unit 222. In the actual operation, each of the units in the base station 2 exchanges data with the mobile station 1 via the transceiver 24 and the antenna, in the manner described herein. The units may be sometimes explained hereunder to exchange data directly with the mobile station 1, just for the convenience of explanations.

The SPS interval controlling unit 211 receives communication intervals generated by the scheduler 23 for a plurality of respective SPS communications established with the mobile station 1 from the scheduler 23. The SPS interval controlling unit 211 then configures the communication intervals for the respective SPS communications to the SPS transmission managing unit 221. The SPS interval controlling unit 211 also notifies the signal generating unit 213 of the communication intervals for the respective SPS communications.

The SPS communication controlling unit 212 receives radio resources to be used in the respective SPS communications from the scheduler 23. The SPS communication controlling unit 212 then notifies the SPS transmission managing unit 221 and the signal generating unit 213 of the radio resources to be used in the respective SPS communications. The SPS communication controlling unit 212 also notifies the SPS transmission managing unit 221 of the timing at which the activation PDCCH is transmitted while no SPS communication is established.

The SPS communication controlling unit 212 receives the communication intervals generated by the scheduler 23 for the respective SPS communications with the mobile station 1 from the scheduler 23. The SPS communication controlling unit 212 then identifies a communication timing at which a plurality of communications are scheduled to occur simultaneously among the plurality of SPS communications, from the communication intervals for the respective acquired SPS communications. In other words, the SPS communication controlling unit 212 identifies a timing at which simultaneous communications are scheduled. The SPS communication controlling unit 212 then uses a predetermined method to shift the communication timings in the identified part of the communication intervals for the respective SPS communications where simultaneous communications are scheduled to occur, so as to avoid such simultaneous communications among the SPS communications. For example, when two SPS communications are established, the SPS communication controlling unit 212 shifts the communication timing of one of the SPS communications to the subframe prior to the one originally scheduled, and shifts the communication timing of the other to the subframe subsequent to the one originally scheduled. To allow DS communications to be performed at the shifted timings, the SPS communication controlling unit 212 determines, for each of the SPS communications, the timing for transmitting a release PDCCH within a time frame prior to the shifted communication timing and subsequent to a communication timing that is immediately prior to the shifted communication timing. To allow SPS communications to be recovered after the shifted communication timings, the SPS communication controlling unit 212 determines, for each of the SPS communications, the timing for transmitting an activation PDCCH at time subsequent to the shifted communication timing. The SPS communication controlling unit 212 then notifies the SPS transmission managing unit 221 and the signal generating unit 213 of the timings for transmitting the release PDCCH and for transmitting an activation PDCCH. The SPS communication controlling unit 212 also notifies the SPS transmission managing unit 221 and the signal generating unit 213 of the shifted transmission timings. The SPS communication controlling unit 212 represents an example of a "control signal transmitting unit".

The signal generating unit 213 receives the SPS intervals from the SPS interval controlling unit 211. The signal generating unit 213 also receives the timings for transmitting a release PDCCH, the timings for transmitting an activation PDCCH, and the shifted transmission timings from the SPS communication controlling unit 212. The signal generating unit 213 then generates RRC signaling including a period and the interval, the timing for transmitting an activation PDCCH, the timing for transmitting a release PDCCH, and the communication timing having shifted, for each of the SPS communications. The signal generating unit 213 then outputs the generated RRC signaling to the transceiver 24.

The signal generating unit 213 also acquires radio resources to be used for each of the SPS communications from the SPS communication controlling unit 212. The signal generating unit 213 then generates data containing an activation PDCCH including information of the radio resources to be used for the corresponding SPS communication. The signal generating unit 213 also generates data containing the release PDCCH. The signal generating unit 213 then outputs the data containing the activation PDCCH or the release PDCCH to the SPS transmission managing unit 221. The signal generating unit 213 also acquires data to be transmitted to the mobile station 1 received from the higher level station 3 from the higher level station transceiver 21. When the signal generating unit 213 receives a notification indicating that SPS communications are currently being executed with the mobile station 1 from the SPS transmission managing unit 221, the signal generating unit 213 generates data for the SPS communication using the acquired data as a PDSCH, and outputs the data to the SPS transmission managing unit 221. When the signal generating unit 213 receives a notification indicating that a DS communication is currently being executed with the mobile station 1 from the SPS transmission managing unit 221, the signal generating unit 213 generates data using the acquired data as a PDSCH, associates a PDCCH, which is a control signal, with the PDSCH, and outputs the data to the SPS transmission managing unit 221.

The signal generating unit 213 receives a retransmission request for the immediately previously transmitted data from the HARQ managing unit 222. The signal generating unit 213 re-generates the data for which the retransmission request is received. The signal generating unit 213 then outputs the re-generated signal to the transceiver 24.

Before an SPS communication is initiated, the SPS transmission managing unit 221 receives data containing an activation PDCCH from the signal generating unit 213. The SPS transmission managing unit 221 also receives timing for transmitting the activation PDCCH for each of the SPS communications from the SPS communication controlling unit 212. The SPS transmission managing unit 221 then transmits the data including an activation PDCCH to the mobile station 1 at the received communication timing. The SPS transmission managing unit 221 notifies the signal generating unit 213 that SPS communications are currently being executed with the mobile station 1.

After transmitting the activation PDCCH, the SPS transmission managing unit 221 receives SPS communication data from the signal generating unit 213. The SPS transmission managing unit 221 then transmits the SPS communication data to the mobile station 1 at the timing for the SPS communication notified by the SPS interval controlling unit 211.

The SPS transmission managing unit 221 receives a release PDCCH from the signal generating unit 213 while the SPS communications are executed. The SPS transmission managing unit 221 also receives the timing for transmitting the release PDCCH in each of the SPS communications from the SPS communication controlling unit 212. The SPS transmission managing unit 221 transmits the release PDCCH to the mobile station 1 at the received communication timing. Subsequently, DS communications are established between the mobile station 1 and the base station 2. The SPS transmission managing unit 221 notifies the signal generating unit 213 that the DS communications are currently being executed with the mobile station 1.

After transmitting the release PDCCH, the SPS transmission managing unit 221 receives data including PDSCH as well as a PDCCH, which is a control signal, from the signal generating unit 213. The SPS transmission managing unit 221 transmits the received data to the mobile station 1.

The SPS transmission managing unit 221 receives data containing an activation PDCCH from the signal generating unit 213 while the DS communications are being executed. The SPS transmission managing unit 221 also receives the timing for transmitting an activation PDCCH for each of the SPS communications from the SPS communication controlling unit 212. The SPS transmission managing unit 221 then transmits the data containing an activation PDCCH to the mobile station 1 at the received communication timing. In response, the communications between the mobile station 1 and the base station 2 are recovered to the SPS communications. The SPS transmission managing unit 221 then notifies the signal generating unit 213 that SPS communications are currently being executed with the mobile station 1. Subsequently, the SPS transmission managing unit 221 continues the SPS communications until the communications are released. The SPS transmission managing unit 221 represents an example of a "communication configuration notifying unit".

The HARQ managing unit 222 receives an input of a NACK transmitted by the mobile station 1 from the transceiver 24. The HARQ managing unit 222 then notifies the signal generating unit 213 of a retransmission request for data transmitted immediately before the NACK is received.

The scheduler 23 stores therein scheduling algorithms for radio transmissions. The scheduler 23 then uses the stored algorithms to acquire a data transmission interval and radio resources to be used for each of the SPS communications with the mobile station 1. The scheduler 23 then transmits the data transmission interval and the acquired like to the SPS interval controlling unit 211. The scheduler 23 also notifies the SPS communication controlling unit 212 of information of the radio resources to be used for each of the SPS communications.

Figure 3:
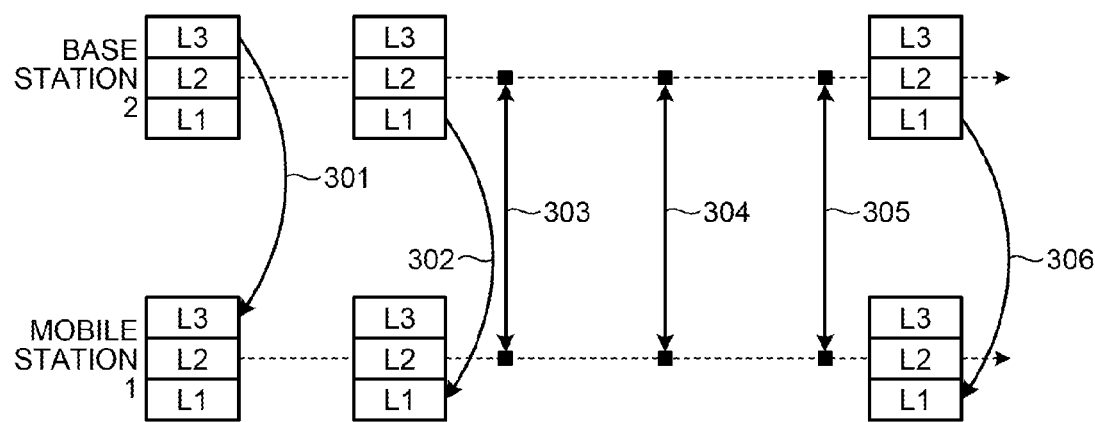
FIG. 3 is a schematic for generally explaining an overall process of an SPS communication.

Explained now with reference to FIG. 3 is an overall process of an SPS communication performed in the radio communication system according to the first embodiment when no communications are scheduled at the same timing. FIG. 3 is a schematic for generally explaining an overall process of an SPS communication. L1 to L3 in FIG. 3 represents the first layer (L1), the second layer (L2), and the third layer (L3) which are the lowest three layers in the open system interconnection (OSI) reference model. Specifically, a physical layer, which belongs to the first layer, provides an information transmission service using a physical channel. A radio resource control (RRC) layer, which is positioned at the third layer, has a function to control the radio resources between a terminal and a network.

The base station 2 transmits RRC signaling 301 that is an L3 signal to the mobile station 1 before executing the actual SPS communications. The mobile station 1 acquires an SPS communication interval via the RRC signaling 301.

Upon initiating the actual SPS communications, the base station 2 transmits a PDCCH 302 including an activation command to the mobile station 1. The mobile station 1 acquires notifications of which radio resources are to be used continuously from the base station 2 via the PDCCH 302.

After the period designated by the RRC signaling 301 elapses from the timing of the PDCCH 302, the mobile station 1 and the base station 2 start exchanging SPS data 303, using the radio resources indicated via the PDCCH 302. The mobile station 1 and the base station 2 also exchange SPS data 304 at a timing after the interval indicated via the RRC signaling 301 elapses from the timing of the SPS data 303. The mobile station 1 and the base station 2 also exchanges SPS data 305 at a timing after the interval indicated via the RRC signaling 301 elapses from the timing of SPS data 304.

When the period of SPS communication indicated via the RRC signaling 301 is completed, the base station 2 instructs the mobile station 1 to release the configurations via an L1 signaling 306 to end the SPS communication. This L1 signaling 306 is a PDCCH including a release command, for example. In response to the release command, the mobile station 1 releases the configurations of the SPS communication, and ends the SPS communication. The SPS communication may also be ended by performing idle transmissions for the number of times specified in a parameter called implicitReleaseAfter.

Figure 4:
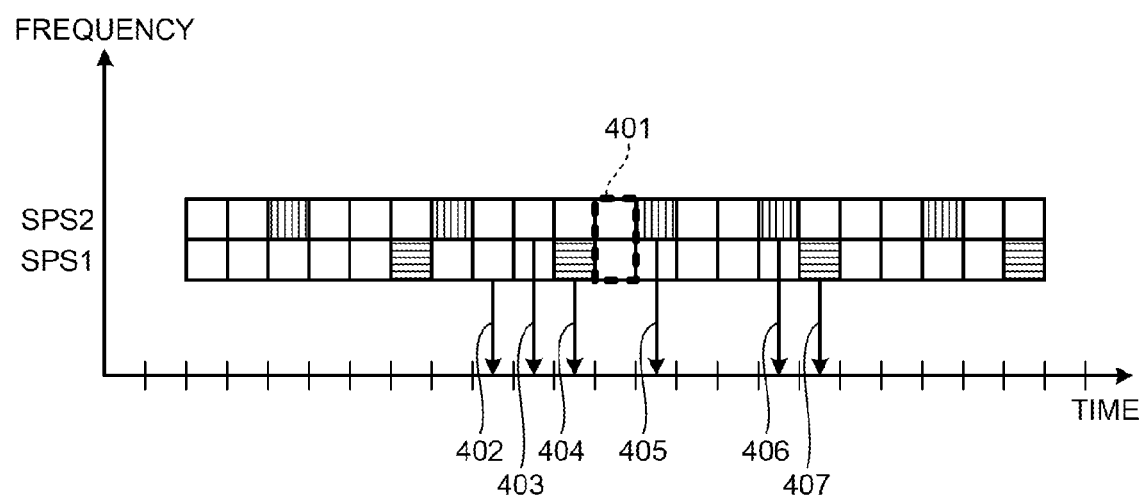
FIG. 4 is a schematic for generally explaining the process performed by the radio communication system according to the first embodiment when communications are scheduled to occur at the same timing.

Explained now with reference to FIG. 4 is an overall process performed by the radio communication system according to the first embodiment when communications are scheduled to occur at the same timing. FIG. 4 is a schematic for generally explaining the process performed by the radio communication system according to the first embodiment when communications are scheduled to occur at the same timing. In the explanation hereunder, it is assumed that two SPS communications are scheduled to occur. In FIG. 4, the vertical axis represents a frequency, and the horizontal axis represents time. Each square in FIG. 4 represents a radio resource that can be allocated to an SPS communication. The lower arrangement of squares represents an SPS communication denoted by SPS1, and the upper arrangement represents the other SPS communication denoted by SPS2. Each subframe filled with horizontal stripes in SPS1 represents a timing of a transmission in the SPS communication SPS1. In the SPS1, five subframes correspond to one interval, when the communication timing is not shifted. Each subframe with vertical stripes in SPS2 represents a timing of a transmission in the SPS communication SPS2. In the SPS2, four subframes correspond to one interval when the communication timing is not shifted. An arrow extended from a square suggests that the base station 2 has transmitted some data using the subframe. The arrival of the arrow to the horizontal axis in FIG. 4 indicates that the mobile station 1 has received the data.

Without shifting the timing of any transmissions, the communication SPS1 and the communication SPS2 would occur simultaneously, at a communication timing 401 surrounded with dotted lines. To address this situation, the SPS communication controlling unit 212 in the base station 2 shifts the communication timing for SPS1 from the communication timing 401 to the subframe prior to the subframe at the communication timing 401. The SPS communication controlling unit 212 also shifts the communication timing for the SPS2 at the communication timing 401 to a subframe subsequent to the subframe at the communication timing 401. The SPS communication controlling unit 212 then also determines the timings for transmitting a release PDCCH 402 for SPS1 and a release PDCCH 403 for SPS2, in time previous to the shifted SPS1 communication timing. The SPS communication controlling unit 212 also determines the timings for transmitting an activation PDCCH 406 for SPS1 and an activation PDCCH 407 for SPS2, in time subsequent to the shifted SPS2 communication timing.

Once the timing for transmitting the release PDCCH 402 for SPS1 determined by the SPS communication controlling unit 212 arrives while SPS communications are being executed, the SPS transmission managing unit 221 transmits the release PDCCH 402 for the communication SPS1 to the mobile station 1. The SPS communication controlling unit 112 in the mobile station 1 then receives the release PDCCH 402 for SPS1, and instructs the SPS reception managing unit 121 to release the SPS1. The SPS reception managing unit 121 then releases the configurations of SPS1, and switches the configurations to those for a DS communication.

Similarly, once the timing for transmitting the release PDCCH 402 for SPS2 determined by the SPS communication controlling unit 212 arrives, the SPS transmission managing unit 221 transmits the release PDCCH 403 for the communication SPS2 to the mobile station. The SPS communication controlling unit 112 in the mobile station 1 then receives the release PDCCH 403 for SPS2, and instructs the SPS reception managing unit 121 to release the configurations of SPS2. The SPS reception managing unit 121 then releases the configurations of SPS2, and switches the configurations to those for a DS communication.

When the communication timing having shifted to the prior subframe for SPS1 arrives, the SPS transmission managing unit 221 transmits data 404 including the PDCCH in the communication SPS1 to the mobile station 1. The SPS reception managing unit 121 in the mobile station 1 then receives the data 404 including the PDCCH via a DS communication.

Similarly, the communication timing having shifted to the subsequent subframe for SPS2 arrives, the SPS transmission managing unit 221 transmits data 405 including the PDCCH in the communication SPS2 to the mobile station 1. The SPS reception managing unit 121 in the mobile station 1 receives the data 405 including the PDCCH via a DS communication.

When the timing for transmitting the activation PDCCH 406 for SPS1 determined by the SPS communication controlling unit 212 arrives while the DS communication is being executed, the SPS transmission managing unit 221 transmits the activation PDCCH 406 for the communication SPS1 to the mobile station 1. The SPS communication controlling unit 112 in the mobile station 1 then receives the activation PDCCH 406 for SPS1, and instructs the SPS reception managing unit 121 to activate the configurations of the SPS communication SPS1. The SPS reception managing unit 121 then switches the configurations of SPS1 back to those of the SPS communication.

Similarly, when the timing for transmitting the activation PDCCH 407 for SPS2 determined by the SPS communication controlling unit 212 arrives, the SPS transmission managing unit 221 transmits the activation PDCCH 407 for the communication SPS2 to the mobile station. The SPS communication controlling unit 112 in the mobile station 1 then receives the activation PDCCH 407 for SPS2, and notifies the SPS reception managing unit 121 of the configurations of the SPS communication SPS2. The SPS reception managing unit 121 then switches the configurations of SPS2 back to those of the SPS communication.

In this example, the release PDCCH and the PDCCH for the DS communication are sent separately. However, the release PDCCH may be included in the PDCCH in the DS communication. Furthermore, although the release PDCCH for SPS1 and the release PDCCH for SPS2 are described to be transmitted at different timings, they may be transmitted at the same timing.

Figure 5:
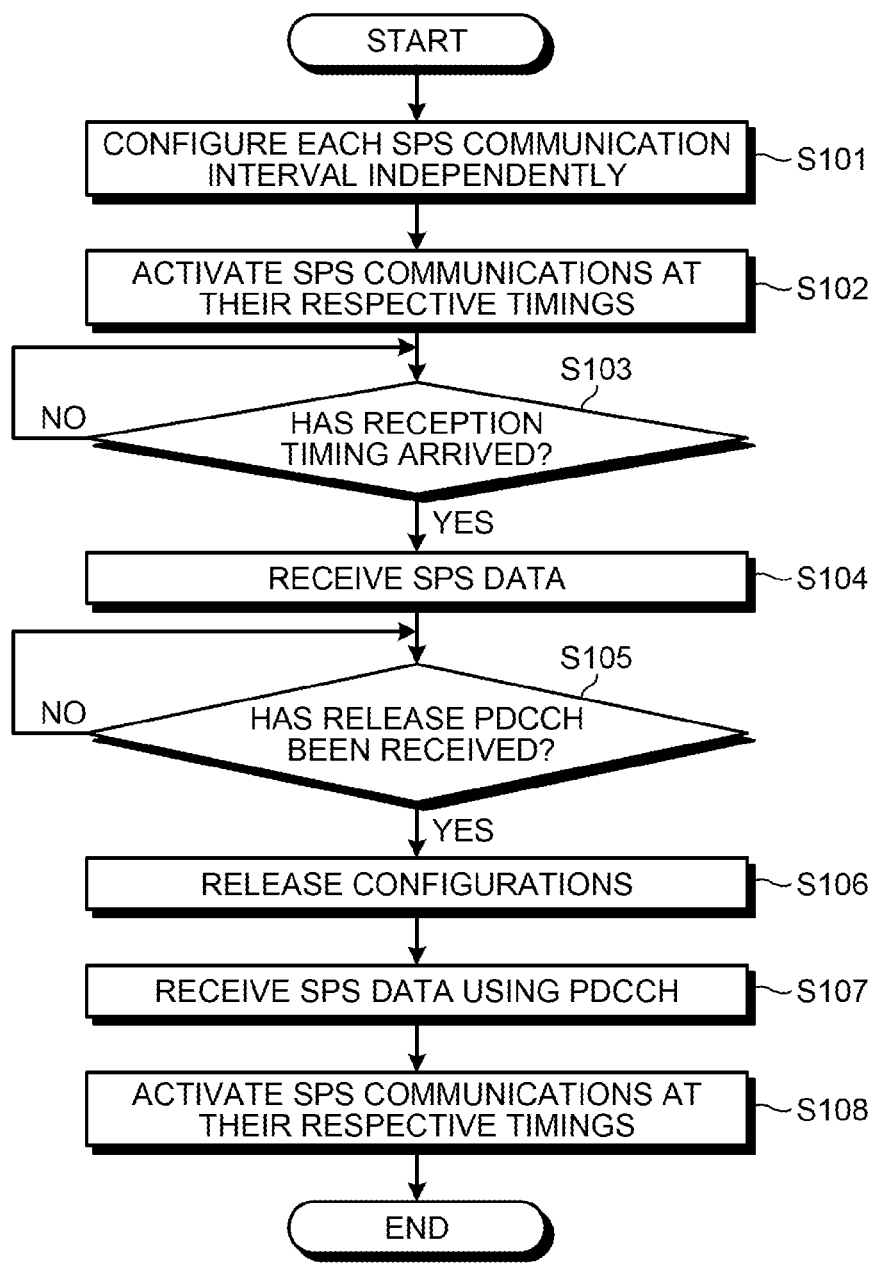
FIG. 5 is a flowchart of a process of resolving scheduled simultaneous communications in the SPS communications in the mobile station according to the first embodiment.

Explained now with reference to FIG. 5 is a process of resolving scheduled simultaneous communications in the SPS communications performed by the mobile station 1 according to the first embodiment. FIG. 5 is a flowchart of a process of resolving scheduled simultaneous communications in the SPS communications in the mobile station according to the first embodiment.

The SPS interval controlling unit 111 notifies the SPS reception managing unit 121 of the intervals for the respective SPS communications notified via RRC signaling, and configures each of the SPS communication intervals independently (Step S101).

The SPS communication controlling unit 112 then receives an activation PDCCH, and instructs the SPS reception managing unit 121 to activate the configurations of the SPS communication using the shifted radio resources, whereby causing the SPS communications to be activated at their respective timings (Step S102).

The SPS reception managing unit 121 then determines if the timing for receiving SPS data has arrived based on the SPS intervals notified by the SPS interval controlling unit 111 (Step S103). If the reception timing has not arrived yet (No at Step S103), the SPS reception managing unit 121 waits for the reception timing.

If the reception timing has arrived (Yes at Step S103), the SPS reception managing unit 121 receives the SPS data at the communication timing for the SPS communication (Step S104).

The SPS reception managing unit 121 determines if a release PDCCH has been received (Step S105). If the release PDCCH has not been received (No at Step S105), the SPS reception managing unit 121 waits until the release PDCCH is received.

If the release PDCCH is received (Yes at Step S105), the SPS reception managing unit 121 releases the configurations of the SPS communications (Step S106).

The SPS reception managing unit 121 receives data including a PDCCH at the reception timing notified by the SPS communication controlling unit 112, and receives the SPS data under the control of the PDCCH (Step S107).

The SPS communication controlling unit 112 then receives an activation PDCCH again, and instructs the SPS reception managing unit 121 to activate the configuration of the SPS communication using the notified radio resources, whereby causing the SPS communications to be activated at their respective timings (Step S108).

Figure 6:
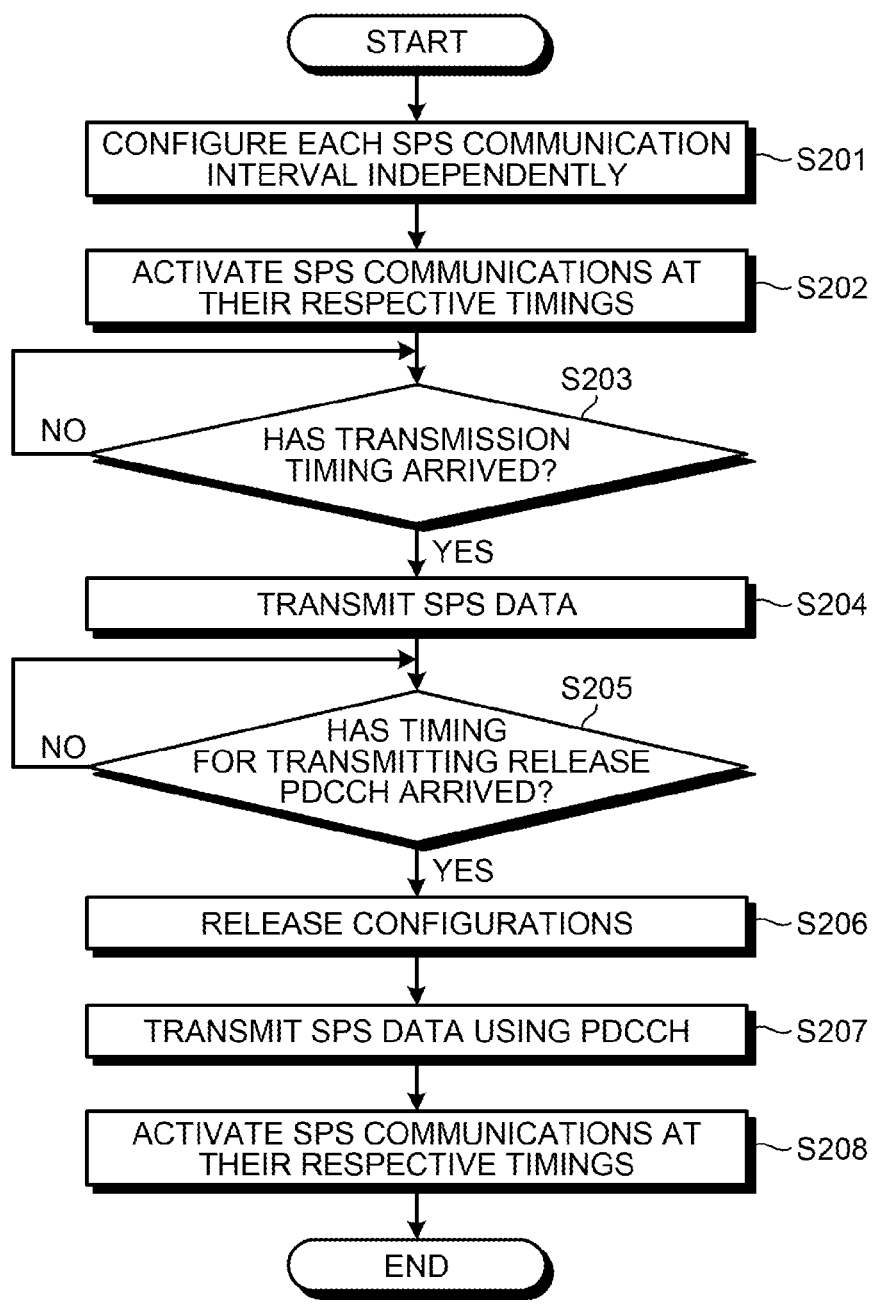
FIG. 6 is a flowchart of a process of resolving scheduled simultaneous communications in the SPS communication performed by the base station according to the first embodiment.

Explained now with reference to FIG. 6 is a process of resolving scheduled simultaneous communications in the SPS communications performed by the base station 2 according to the first embodiment. FIG. 6 is a flowchart of a process of resolving scheduled simultaneous communications in the SPS communication performed by the base station according to the first embodiment.

The SPS interval controlling unit 211 notifies the SPS transmission managing unit 221 of the SPS communication intervals acquired from the scheduler 23. The SPS transmission managing unit 221 configures each of the SPS communication intervals independently (Step S201).

The SPS communication controlling unit 212 instructs the SPS transmission managing unit 221 to transmit an activation PDCCH for each of the SPS communications. In response to the instruction from the SPS communication controlling unit 212, the SPS transmission managing unit 221 transmits the activation PDCCH to the mobile station 1, whereby causing the SPS communications with the mobile station 1 to be activated at their respective timings (Step S202).

The SPS transmission managing unit 221 determines if the timing for transmitting SPS data has arrived based on the SPS intervals notified by the SPS interval controlling unit 211 (Step S203). If the transmission timing has not arrived yet (No at Step S203), the SPS transmission managing unit 221 waits for the transmission timing.

If the transmission timing has arrived (Yes at Step S203), the SPS transmission managing unit 221 transmits SPS data at communication timing for the SPS communication (Step S204).

The SPS transmission managing unit 221 then determines if the timing for transmitting a release PDCCH has arrived (Step S205). If the timing for transmitting a release PDCCH has not arrived (No at Step S205), the SPS transmission managing unit 221 waits until the transmission timing arrives.

If the timing for transmitting a release PDCCH has arrived (Yes at Step S205), the SPS transmission managing unit 221 transmits a release PDCCH to the mobile station 1, and releases the configurations of the SPS communications with the mobile station 1 (Step S206).

The SPS transmission managing unit 221 then transmits SPS data using data including PSCCH, at the communication timing notified by the SPS communication controlling unit 212 (Step S207).

The SPS communication controlling unit 212 then instructs the SPS transmission managing unit 221 to transmit an activation PDCCH for each of the SPS communications. In response to the instruction from the SPS communication controlling unit 212, the SPS transmission managing unit 221 transmits the activation PDCCH to the mobile station, whereby causing the SPS communications with the mobile station 1 to be activated at their respective timings (Step S208).

In the manner explained above, when there are scheduled simultaneous communications among the SPS communications, the radio communication apparatus according to the first embodiment shifts the communication timings for the respective SPS communications before the SPS data is transmitted. In this manner, even when the communications are scheduled to occur at the same timing at their original intervals, all of the SPS data in each of the SPS communications can be transmitted.

First Modification

A first modification of the first embodiment will now be explained. In a radio communication system according to the first modification, when communications are scheduled to occur at the same timing among the SPS communications, one of the SPS communications is continued, and the other SPS communication is switched to a DS communication.

The SPS communication controlling unit 212 according to the first modification receives quality of service (QoS) for each of the Semi Persistent Schedulings from the scheduler 23, for example. Before shifting the timing of one of the simultaneous communications, the SPS communication controlling unit 212 determines to continue the SPS communication whose QoS is the highest. The SPS communication controlling unit 212 then uses a predetermined method to shift the timings of simultaneous communications other than the SPS communication determined to be continued. For example, when there are two SPS communications, the SPS communication controlling unit 212 shifts the communication timings of the SPS communication having a lower QoS to the subframe subsequent to the one originally scheduled. The SPS communication controlling unit 212 also determines the timing for transmitting a release PDCCH for each of the SPS communications whose communication timings are shifted, within a time frame prior to the communication timing and subsequent to a SPS communication timing that is immediately prior to the shifted communication timing. To allow SPS communications having switched to DS communications to be recovered to the SPS communications after the shifted communication timings, the SPS communication controlling unit 212 also determines, for each of the SPS communications, the timing for transmitting an activation PDCCH at time subsequent to the communication timing having shifted.

The SPS communication controlling unit 212 then notifies the SPS transmission managing unit 221 and the signal generating unit 213 of the timings for transmitting a release PDCCH and the timing for transmitting an activation PDCCH. The SPS communication controlling unit 212 also notifies the SPS transmission managing unit 221 and the signal generating unit 213 of the shifted communication timings.

The signal generating unit 213 transmits the timing for transmitting a release PDCCH, the timing for transmitting an activation PDCCH, and the shifted communication timings for each of the SPS communications other than that for which the SPS communication is determined to be continued to the mobile station 1, via the RRC signaling. The RCC signaling is merely an example of the way for notifying how the timings are shifted. For example, as other alternatives, the way in which the timings are shifted may be informed using notifying information, or may be described in a specification. For example, as another possible way to shift the communication timings when communications are scheduled to occur at the same timing, a definition may be established in advance so that SPS1 is released at a subframe second prior to the one originally scheduled.

The SPS communication controlling unit 212 transmits a release PDCCH for each of the SPS communications other than that whose SPS communication is to be continued to the mobile station 1 at the communication timing notified by the SPS communication controlling unit 212. The SPS communication controlling unit 212 then transmits data including a PDCCH for each of the SPS communications other than that whose SPS communication is continued to the mobile station 1 at the communication timing notified by the SPS communication controlling unit 212. The SPS communication controlling unit 212 then transmits an activation PDCCH for each of the SPS communications other than that whose SPS communication is continued to the mobile station 1 at the communication timing notified by the SPS communication controlling unit 212.

The SPS communication controlling unit 112 notifies the SPS reception managing unit 121 of the timing for transmitting a release PDCCH, the timing for transmitting an activation PDCCH, and the communication timing having shifted for each of the SPS communications other than that whose SPS communication is to be continued, signaled via RRC.

The SPS communication controlling unit 112 also receives a release PDCCH for each of the SPS communications other than that whose SPS communication is continued, and notifies the SPS reception managing unit 121 of a release of configurations of the SPS communications other than that whose SPS communication is to be continued. The SPS communication controlling unit 112 then receives an activation PDCCH for each of the SPS communications other than that whose SPS communication is continued, and notifies the SPS reception managing unit 121 of the configurations of the SPS communications other than that whose SPS communication is to be continued.

Upon receiving the notification from the SPS communication controlling unit 112, the SPS reception managing unit 121 releases the configurations of each of the SPS communications other than that whose SPS communication is continued, and switches each of the communications to a DS communication. The SPS reception managing unit 121 then receives data including a PDCCH for each of the SPS communications other than that whose SPS communication is continued, and processes the data in accordance with the PDCCH. Upon receiving the notification from the SPS communication controlling unit 112, the SPS reception managing unit 121 configures the SPS communications other than that whose SPS communication is continued. During this time, for the SPS communication whose SPS communication is determined to be continued by the base station 2, the SPS reception managing unit 121 receives data in the SPS communication.

Figure 7:
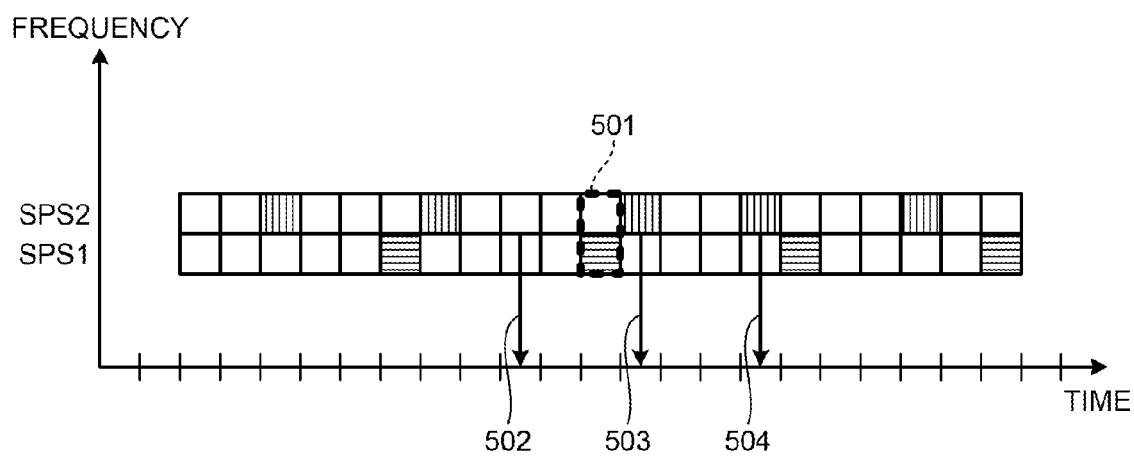
FIG. 7 is a schematic for generally explaining the process performed by the radio communication system according to a first modification of the first embodiment when communications are scheduled to occur at the same timing.

Explained now with reference to FIG. 7 is an overall process performed by the radio communication system according to the first modification when communications are scheduled to occur at the same timing. FIG. 7 is a schematic for generally explaining the process performed by the radio communication system according to the first modification when communications are scheduled to occur at the same timing. In the explanation hereunder, it is assumed that two SPS communications are scheduled to occur. The denotations in FIG. 7 are the same as those explained with reference to FIG. 4.

Without shifting any transmission timings, the communication SPS1 and the communication SPS2 would occur simultaneously, at a communication timing 501 surrounded by dotted lines. To address this situation, the SPS communication controlling unit 212 in the base station 2 determines to continue the SPS communication for SPS1 with a higher QoS. The SPS communication controlling unit 212 shifts the communication in the SPS2 at the communication timing 501 to the subframe subsequent to the one originally scheduled. The SPS communication controlling unit 212 also determines the time for transmitting a release PDCCH 502 for SPS2 at time prior to the communication timing having shifted in the SPS2. The SPS communication controlling unit 212 also determines the timing for transmitting an activation PDCCH 503 for SPS2 at time subsequent to the communication timing having shifted in the SPS2.

When the timing for transmitting the release PDCCH 502 for the SPS2 determined by the SPS communication controlling unit 212 arrives, the SPS transmission managing unit 221 transmits the release PDCCH 502 for the communication SPS2 to the mobile station. The SPS communication controlling unit 112 in the mobile station 1 then receives the release PDCCH 502 for SPS2, and instructs the SPS reception managing unit 121 to release the configurations of SPS2. The SPS reception managing unit 121 then releases the configurations of SPS2, and switches the configurations to those for a DS communication.

When the communication timing shifted to the subsequent subframe for SPS2 arrives, the SPS transmission managing unit 221 transmits data 505 including the PDCCH for the communication SPS2 to the mobile station 1. The SPS reception managing unit 121 in the mobile station 1 receives the data 505 including the PDCCH via a DS communication.

During this time, the SPS transmission managing unit 221 continues the SPS communication for SPS1. The SPS reception managing unit 121 receives the SPS data for SPS1 via the SPS communication.

When the timing for transmitting an activation PDCCH 504 for SPS2 determined by the SPS communication controlling unit 212 arrives while the DS communication is being executed, the SPS transmission managing unit 221 transmits the activation PDCCH 504 for the communication SPS2 to the mobile station 1. The SPS communication controlling unit 112 in the mobile station 1 receives the activation PDCCH 504 for SPS2, and notifies the SPS reception managing unit 121 of the configurations of the SPS communication SPS2. The SPS reception managing unit 121 then recovers the configurations of an SPS communication for SPS2.

During this time, the SPS transmission managing unit 221 continues the SPS communication for SPS1. The SPS reception managing unit 121 keeps receiving the SPS data for SPS1 via the SPS communication.

In the mobile station 1 and the base station 2 according to the first modification, the process of resolving scheduled simultaneous communications in the SPS communication is the same as those illustrated in FIGS. 5 and 6, except that one of the targets of release and activation is removed from the flowchart illustrated in FIGS. 5 and 6.

In the manner explained above, the radio communication system according to the first modification continues one of a plurality of SPS communications among which communications are scheduled at the same timing while shifting the communication timings of the others, and performs DS communications using the shifted communication timings. In this manner, the number of communications whose communication timing is shifted is reduced, compared with that in the first embodiment so that processing load can be reduced. Furthermore, because exchanges of an activation PDCCH and a release PDCCH can be reduced, the amount of signaling can also be reduced. In this manner, the radio communications can be stabilized further.

[b] Second Embodiment

A second embodiment of the present invention will now be explained. The radio communication system according to the second embodiment is different from those according to the first embodiment and the first modification thereof in that each of a base station and a mobile station autonomously establishes a period over which a DS communication is performed so that the same period is shared as such a period between the base station and the mobile station, and performs the DS communication during this period. The mobile station and the base station according to the second embodiment can also be represented by the block diagrams in FIGS. 1 and 2, respectively. In the explanation hereunder, the configuration and the operation of the units that are the same as those according to the first embodiment and the first modification thereof will be omitted.

The SPS interval controlling unit 211 in the base station 2 notifies the SPS transmission managing unit 221 of the communication intervals for the respective SPS communications acquired from the scheduler 23, and establishes the periodic communication intervals for the respective SPS communications. The SPS interval controlling unit 211 represents an example of a "communication establishing unit".

The SPS communication controlling unit 212 identifies a communication timing at which the communications are scheduled to occur at the same timing among the SPS communications, based on the communication intervals acquired from the scheduler 23. The SPS communication controlling unit 212 then determines a given period starting from the latest one of the SPS communication timings immediately prior to the simultaneous communication timing and ending at the earliest one of the communication timings immediately subsequent to the simultaneous communication timing. For example, the SPS communication controlling unit 212 establishes the latest one of the SPS communication timings immediately prior to the simultaneous communication timing as a starting point of the given period. For example, the SPS communication controlling unit 212 also establishes the starting point of the earliest one of the SPS communication timings immediately subsequent to the simultaneous communication timing as an ending point of the given period.

The SPS communication controlling unit 212 then notifies the SPS transmission managing unit 221 of the given period thus determined. The SPS communication controlling unit 212 represents an example of a "transmission timing identifying unit".

During the given period notified by the SPS communication controlling unit 212, the SPS transmission managing unit 221 transmits data including a PDCCH to the mobile station 1. The SPS transmission managing unit 221 represents an example of a "transmission controlling unit".

The SPS communication controlling unit 112 in the mobile station 1 acquires the communication intervals for the respective SPS communications from RRC signaling received thereby, and identifies a timing at which a plurality of SPS communication are scheduled to occur simultaneously among the SPS communications. The SPS communication controlling unit 112 then identifies a given period starting from the latest one of the SPS communication timings immediately prior to the simultaneous communication timing and ending at the earliest one of the communication timings immediately subsequent to the simultaneous communication timing. The way in which the given period is determined is the same as that in the SPS communication controlling unit 212 in the base station 2. In this manner, the SPS communication controlling unit 112 can identify the same given period as that determined by the SPS communication controlling unit 212.

The SPS communication controlling unit 112 then notifies the SPS reception managing unit 121 of the given period thus determined. The SPS communication controlling unit 112 represents an example of a "reception timing identifying unit".

For the given period notified by the SPS communication controlling unit 112, the SPS reception managing unit 121 releases the SPS configurations, and receives data including a PDCCH. For example, during the given period, the SPS reception managing unit 121 blind-decodes the PDCCH, detects a PDCCH addressed to the mobile station 1, and attempts to receive data. The SPS reception managing unit 121 represents an example of a "reception controlling unit".

Figure 8:
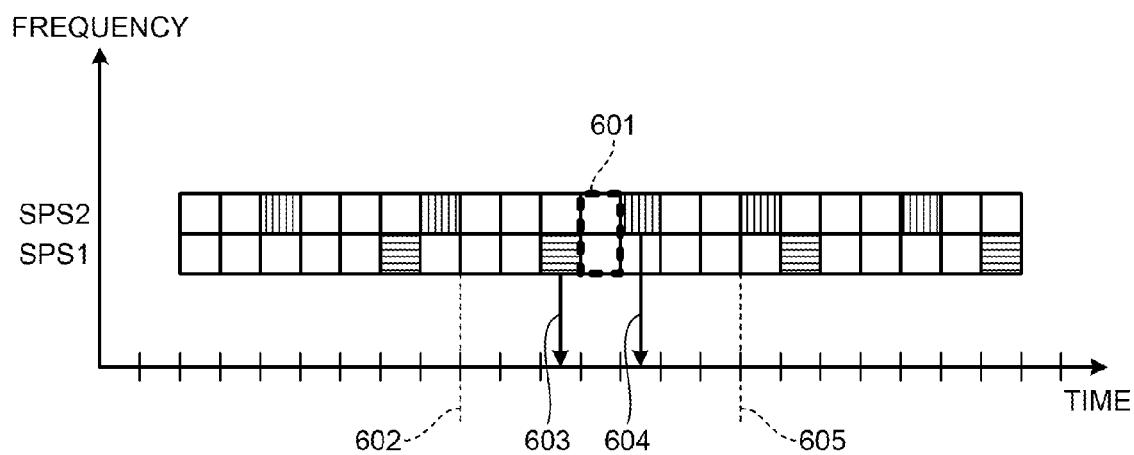
FIG. 8 is a schematic for generally explaining the process performed by a radio communication system according to a second embodiment of the present invention when communications are scheduled to occur at the same timing.

Explained now with reference to FIG. 8 is an overall process performed by the radio communication system according to the second embodiment when communications are scheduled to occur at the same timing. FIG. 8 is a schematic for generally explaining the process performed by the radio communication system according to the second embodiment when communications are scheduled to occur at the same timing. In the explanation hereunder, it is assumed that two SPS communications are scheduled to occur. The denotations in FIG. 8 are the same as those explained with reference to FIG. 4.

Without shifting any transmission timings, the communication SPS1 and the communication SPS2 would occur simultaneously at ea communication timing 601 surrounded by dotted lines. To address this situation, the SPS communication controlling unit 212 in the base station 2 establishes a period from timing 602 to timing 605 as the given time period. Similarly, the SPS communication controlling unit 112 in the mobile station 1 identifies a period from the timing 602 to the timing 605 as the given time period.

When the timing 602 determined by the SPS communication controlling unit 112 arrives, the SPS reception managing unit 121 releases the configurations of the SPS communication for SPS1 and SPS2. The SPS reception managing unit 121 then switches these communications to DS communications, and waits for data including a PDCCH for each of SPS1 and SPS2. During the period from the timing 602 to the timing 605 determined by the SPS communication controlling unit 112, the SPS transmission managing unit 221 transmits data 603 and 604 including a PDCCH at different timings, respectively. The SPS reception managing unit 121 then receives each piece of the data 603 and 604 including a PDCCH.

When the timing 605 determined by the SPS communication controlling unit 112 then arrives, the SPS reception managing unit 121 configures the SPS communications to SPS1 and SPS2. The SPS transmission managing unit 221 performs the SPS communications for both SPS1 and SPS2 subsequently to the timing 605 determined by the SPS communication controlling unit 112.

Figure 9:
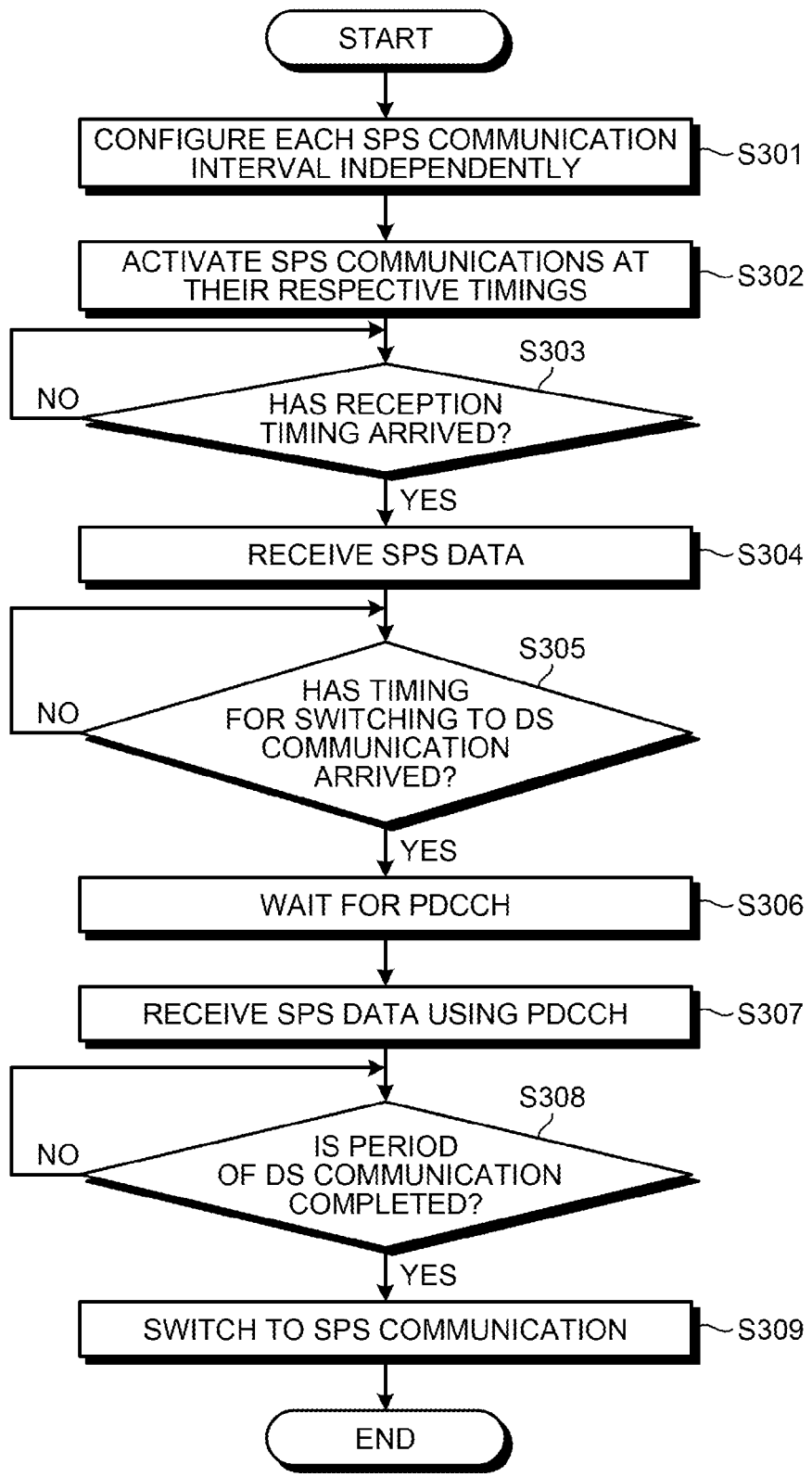
FIG. 9 is a flowchart of a process of resolving scheduled simultaneous communications in the SPS communication performed by the mobile station according to the second embodiment.

Explained now with reference to FIG. 9 is a process of resolving scheduled simultaneous communications in the SPS communications performed by the mobile station 1 according to the second embodiment. FIG. 9 is a flowchart of the process of resolving scheduled simultaneous communications in the SPS communications performed by the mobile station according to the second embodiment.

The SPS interval controlling unit 111 notifies the SPS reception managing unit 121 of the intervals for respective SPS communications via RRC signaling, and configures each of the SPS communication intervals independently (Step S301).

The SPS communication controlling unit 112 then receives an activation PDCCH, and instructs the SPS reception managing unit 121 to activate the configurations of the SPS communication using the notified radio resources, whereby causing the SPS communications to be activated at their respective timings (Step S302).

The SPS reception managing unit 121 then determines if the timing for receiving SPS data has arrived based on the SPS intervals notified by the SPS interval controlling unit 111 (Step S303). If the reception timing has not arrived yet (No at Step S303), the SPS reception managing unit 121 waits for the reception timing.

If the reception timing has arrived (Yes at Step S303), the SPS reception managing unit 121 receives the SPS data at the communication timings for the respective SPS communications (Step S304).

The SPS reception managing unit 121 determines if the timing for switching to DS communications at the starting point of the given period notified by the SPS communication controlling unit 112 has arrived (Step S305). If the timing for switching to DS communications has not arrived yet (No at Step S305), the SPS reception managing unit 121 waits until the timing for switching to DS communications arrives.

If the timing for switching to DS communications has arrived (Yes at Step S305), the SPS reception managing unit 121 releases the configurations of the SPS communication, and switches to the DS communications. The SPS reception managing unit 121 waits for pieces of data including a PDCCH (Step S306). The SPS reception managing unit 121 then receives the SPS data via the PDCCH (Step S307).

The SPS reception managing unit 121 then determines if the time for ending the DS communication period at the ending point of the given period notified by the SPS communication controlling unit 112 has arrived (Step S308). If the time for ending the DS communication period has not arrived yet (No at Step S308), the SPS reception managing unit 121 waits until the time for ending the DS communication period arrives.

If the time for ending the DS communication period has arrived (Yes at Step S308), the SPS reception managing unit 121 changes the configuration to the SPS communications (Step S309).

Figure 10:
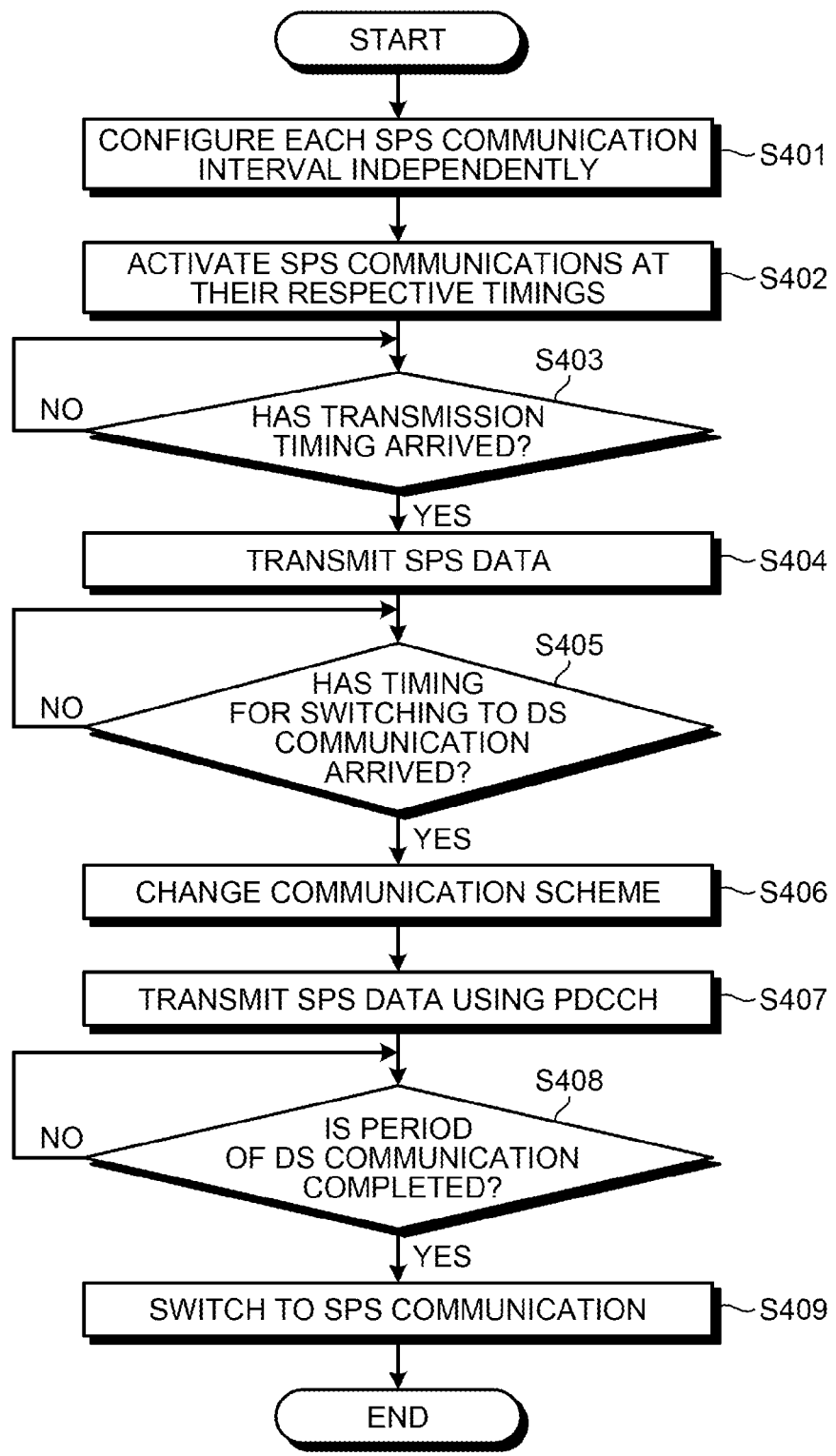
FIG. 10 is a flowchart of a process of resolving scheduled simultaneous communications in the SPS communication performed by the base station according to the second embodiment.

Explained now with reference to FIG. 10 is a process of resolving scheduled simultaneous communications in the SPS communications performed by the base station 2 according to the second embodiment. FIG. 10 is a flowchart of a process of resolving scheduled simultaneous communications in the SPS communications performed by the base station according to the second embodiment.

The SPS interval controlling unit 211 notifies the SPS transmission managing unit 221 of the SPS communication intervals acquired from the scheduler 23. The SPS transmission managing unit 221 then configures the SPS communication intervals independently (Step S401).

The SPS communication controlling unit 212 instructs the SPS transmission managing unit 221 to transmit an activation PDCCH for each of the SPS communications. In response to the instruction from the SPS communication controlling unit 212, the SPS transmission managing unit 221 transmits the activation PDCCHs to the mobile station 1, whereby causing the configurations for the respective SPS communications in the mobile station 1 to be activated at their respective timings (Step S402).

The SPS transmission managing unit 221 then determines if the SPS data transmission timing has arrived based on the SPS intervals notified by the SPS interval controlling unit 211 (Step S403). If the transmission timing has not arrived yet (No at Step S403), the SPS transmission managing unit 221 waits for the transmission timing.

If the transmission timing has arrived (Yes at Step S403), the SPS transmission managing unit 221 transmits the SPS data at the communication intervals for the SPS communications (Step S404).

The SPS transmission managing unit 221 then determines if the timing for switching to DS communications, which is a timing at the starting point of the given period notified by the SPS communication controlling unit 212, has arrived (Step S405). If the timing for switching to DS communications has not arrived yet (No at Step S405), the SPS transmission managing unit 221 waits until the timing for switching to DS communications arrives.

If the timing for switching to DS communications has arrived (Yes at Step S405), the SPS transmission managing unit 221 changes the communication scheme to the DS communications (Step S406). The SPS transmission managing unit 221 then transmits SPS data using PDCCHs (Step S407).

The SPS transmission managing unit 221 then determines if the time for ending the DS communication period at the ending point of the given period notified by the SPS communication controlling unit 212 has arrived (Step S408). If the time for ending the DS communication period has not arrived yet (No at Step S408), the SPS transmission managing unit 221 waits until the time for ending the DS communication period arrives.

If the time for ending the DS communication period has arrived (Yes at Step S408), the SPS transmission managing unit 221 changes the configuration to the SPS communication (Step S409).

In the manner explained above, in the radio communication system according to the second embodiment, when a plurality of communications are scheduled to occur at the same timing, each of the mobile station and the base station autonomously acquires the period over which DS communications are performed, and executes the DS communications during this period so that the communications are performed at shifted communication timings. In this manner, even when a plurality of communications are scheduled to occur at the same timing, all of the data for each of the SPS communications can be received. Furthermore, because no additional activation signaling and releasing signaling are transmitted, the amount of signaling can be reduced, compared with that in the first embodiment. Therefore, the radio communications can be stabilized further.

In the explanation above, the mobile station 1 waits for receptions of data including a PDCCH for over the entire given time period. However, the mobile station 1 does not need to wait for the data over the entire given time period if the reception timings are known. For example, communication timings may be shared between the mobile station 1 and the base station 2, and the mobile station 1 and the base station 2 may establish an agreement that data including a PDCCH may be transmitted and received at each of these timings. Under such conditions, the mobile station 1 can wait for the data including a PDCCH only at these timings. As a way for sharing the way in which communication timings are shifted between the mobile station 1 and the base station 2, the base station 2 may notify the mobile station 1 of such information via RRC signaling or the like. Alternatively, the way in which the communication timings are shifted may be shared between the mobile station 1 and the base station 2 in advance, or shared by means of notifying information. By sharing the timing information, the time over which the mobile station 1 waits for the data including a PDCCH can be reduced, so that the load of the mobile station 1 can be reduced.

[c] Third Embodiment

A third embodiment of the present invention will now be explained. A radio communication system according to the third embodiment is different from those according to the embodiments and the modification described above in that the base station creates communication schedules in which the communications scheduled to occur at the same timing are shifted in advance for the respective SPS communications, and performs the SPS communications in accordance with the communication schedules, without switching to the DS. The mobile station and the base station according to the third embodiment can also be represented by the block diagrams in FIGS. 1 and 2, respectively. In the explanation hereunder, the configuration and the operation of the units that are the same as those according to the embodiments and the modification described above will be omitted.

The SPS communication controlling unit 212 in the base station 2 identifies a communication timing at which a plurality of SPS communications are scheduled to occur simultaneously, based on communication intervals for the respective SPS communications acquired from the scheduler 23. The SPS communication controlling unit 212 then uses a predetermined method to shift the communication timings in the identified part of the communication intervals for the respective SPS communications where simultaneous communications are scheduled to occur, so as to avoid such simultaneous communications among the SPS communications. The SPS communication controlling unit 212 then notifies the SPS transmission managing unit 221 and the signal generating unit 213 of communication schedules in which the timings are shifted. The SPS communication controlling unit 212 represents an example of a "communication timing correcting unit".

The SPS transmission managing unit 221 corrects the periodic intervals notified by the SPS interval controlling unit 211 for the respective SPS communications, using the communication timings shifted and notified by the SPS communication controlling unit 212. Such a correction can be achieved by adding an offset to the communication timing to be shifted, for example. The SPS transmission managing unit 221 then notifies the signal generating unit 213 of the corrected communication schedules for the respective SPS communications. The SPS transmission managing unit 221 represents an example of a "communication timing notifying unit".

The signal generating unit 213 generates RRC signaling including the corrected communication timings for the respective SPS communications, and notifies the mobile station 1 of the RRC signaling.

The SPS interval controlling unit 111 in the mobile station 1 acquires the communication timings for the respective SPS communications from the received RRC. The SPS interval controlling unit 111 then notifies the SPS reception managing unit 121 of the communication timings for respective acquired SPS communications. The SPS interval controlling unit 111 represents an example of a "communication timing acquiring unit".

The SPS reception managing unit 121 performs SPS communications with the base station in accordance with the respective schedules notified by the SPS interval controlling unit 111.

Figure 11:
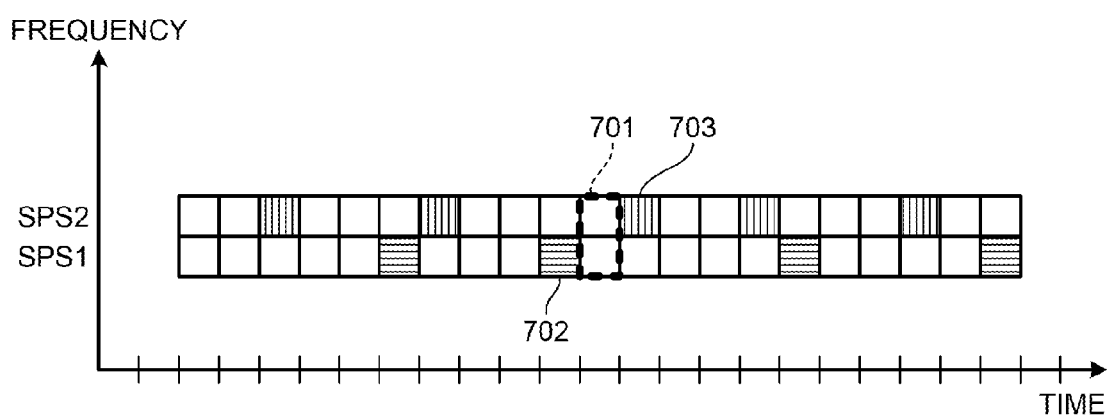
FIG. 11 is a schematic for generally explaining the process performed by a radio communication system according to a third embodiment of the present invention when communications are scheduled to occur at the same timing.

Explained now with reference to FIG. 11 is an overall process performed by a radio communication system according to the third embodiment when communications are scheduled to occur at the same timing. FIG. 11 is a schematic for generally explaining the process performed by the radio communication system according to the third embodiment when communications are scheduled to occur at the same timing. In the explanation hereunder, it is assumed that two SPS communications are scheduled to occur. The denotations in FIG. 11 are the same as those explained with reference to FIG. 4.

Without shifting any transmission timings, the communication SPS1 and the communication SPS2 would occur simultaneously at a communication timing 701 surrounded by dotted lines. To address this situation, the SPS communication controlling unit 212 in the base station 2 shifts the communication timing 701 for the SPS1 to a communication timing 702 which is a subframe prior to the communication timing 701. The SPS communication controlling unit 112 also shifts the communication timing 701 for the SPS2 to a communication timing 703 that is a subframe subsequent to the communication timing 701.

The SPS transmission managing unit 221 then uses the communication timings illustrated in FIG. 11 as communication schedules for SPS1 and SPS2, respectively. The signal generating unit 213 notifies the mobile station 1 of the communication schedules illustrated in FIG. 11. The SPS reception managing unit 121 in the mobile station 1 configures the communication schedules illustrated in FIG. 11 for the SPS communications SPS1 and SPS2, respectively. In this manner, the mobile station 1 and the base station 2 can transmit and receive data for SPS1 and SPS2 at the communication timings illustrated in FIG. 11.

Figure 12:
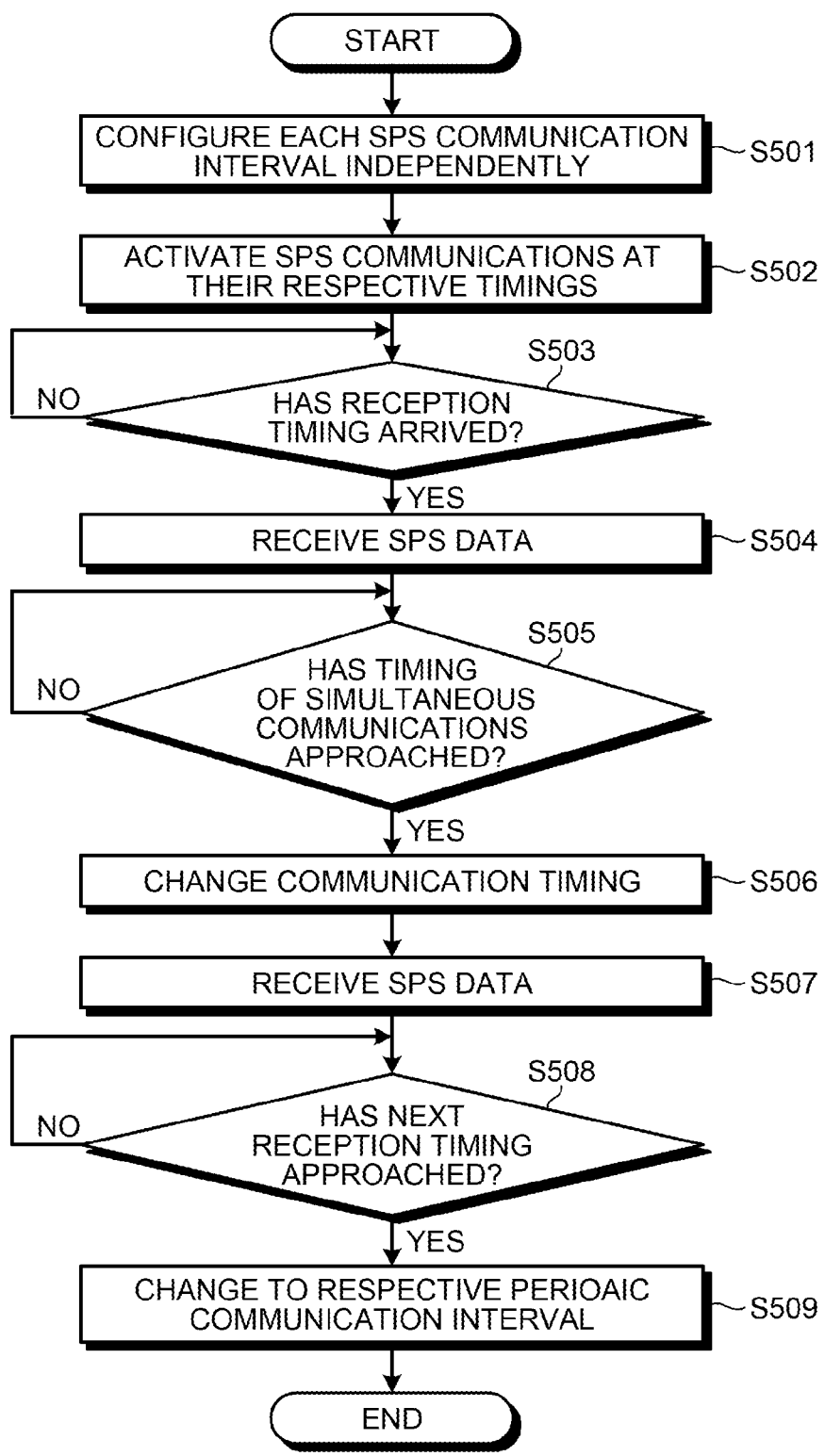
FIG. 12 is a flowchart of a process resolving scheduled simultaneous communications in the SPS communication performed by the mobile station according to the third embodiment.

Explained now with reference to FIG. 12 is a process of resolving scheduled simultaneous communications in the SPS communications performed by the mobile station 1 according to the third embodiment. FIG. 12 is a flowchart of a process of resolving scheduled simultaneous communications in the SPS communication performed by the mobile station according to the third embodiment.

The SPS interval controlling unit 111 notifies the SPS reception managing unit 121 of the corrected communication schedules for respective SPS communications notified via RRC signaling, and configures the SPS communication intervals independently (Step S501).

The SPS communication controlling unit 112 then receives an activation PDCCH, and instructs the SPS reception managing unit 121 to activate the configurations of the SPS communication using the notified radio resources, whereby causing the SPS communications to be activated at their respective timings (Step S502).

The SPS reception managing unit 121 then determines if the timing for receiving SPS data has arrived based on the SPS schedules notified by the SPS interval controlling unit 111

(Step S503). If the reception timing has not arrived yet (No at Step S503), the SPS reception managing unit 121 waits for the reception timing.

If the reception timing has arrived (Yes at Step S503), the SPS reception managing unit 121 receives the SPS data at the communication timing for the SPS communication (Step S504).

The SPS reception managing unit 121 then determines if the timing of simultaneous communications has approached based on the intervals for the respective Semi Persistent Schedulings notified by the SPS interval controlling unit 111 (Step S505). If the timing of simultaneous communications has not approached yet (No at Step S505), the SPS reception managing unit 121 waits until the timing of simultaneous communications approaches.

If the timing of simultaneous communications has approached (Yes at Step S505), the SPS reception managing unit 121 changes the SPS communication timings to those that are shifted from the respective periodic communication intervals (Step S506). The SPS reception managing unit 121 then receives the SPS data at the shifted communication timings for the respective SPS communications (Step S507).

The SPS reception managing unit 121 then determines if the next reception timing has approached (Step S508). If the next reception timing has not approached yet (No at Step S508), the SPS reception managing unit 121 waits until the next reception timing approaches.

If the next reception timing has approached (Yes at Step S508), the SPS reception managing unit 121 changes the schedules of the respective SPS communications to the respective periodic communication intervals (Step S509).

Figure 13:
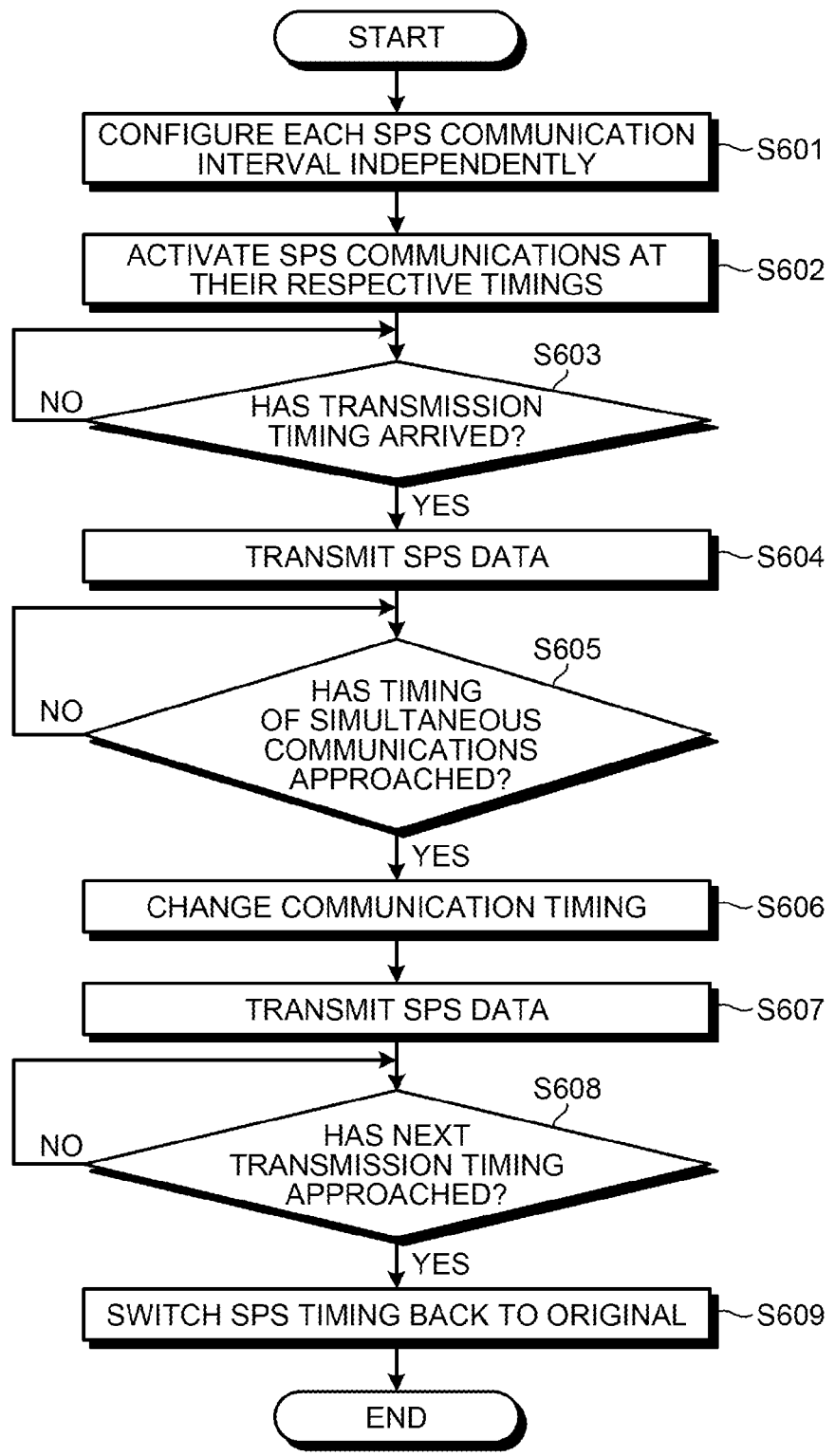
FIG. 13 is a flowchart of a process of resolving scheduled simultaneous communications in the SPS communication performed by the base station according to the third embodiment.

Explained now with reference to FIG. 13 is a process of resolving scheduled simultaneous communications in the SPS communications performed by the base station 2 according to the third embodiment. FIG. 13 is a flowchart of the process of resolving scheduled simultaneous communications in the SPS communication performed by the base station according to the third embodiment.

The SPS interval controlling unit 211 notifies the SPS transmission managing unit 221 of the SPS communication schedules acquired from the scheduler 23. The SPS transmission managing unit 221 then configures each of the SPS communications independently (Step S601).

The SPS communication controlling unit 212 then instructs the SPS transmission managing unit 221 to transmit an activation PDCCH for each of the SPS communications. In response to the instruction from the SPS communication controlling unit 212, the SPS transmission managing unit 221 transmits the activation PDCCH to the mobile station 1, whereby causing the respective SPS communications for the mobile station 1 to be activated at their respective timings (Step S602).

The SPS transmission managing unit 221 determines if the timing for transmitting SPS data has arrived based on the SPS communication schedules notified by the SPS interval controlling unit 211 (Step S603). If the transmission timing has not arrived yet (No at Step S603), the SPS transmission managing unit 221 waits for the transmission timing.

If the transmission timing has arrived (Yes at Step S603), the SPS transmission managing unit 221 transmits the SPS data at the transmission timing for the SPS communication (Step S604).

The SPS transmission managing unit 221 then determines if the timing of simultaneous communications has approached based on corrected SPS communication schedules (Step S605). If the timing of simultaneous communications has not approached yet (No at Step S605), the SPS transmission managing unit 221 waits until the timing of simultaneous communications approaches.

If the timing of simultaneous communications has approached (Yes at Step S605), the SPS transmission managing unit 221 changes the SPS communication schedules to those in which the communication timings are shifted from those in the respective original periodic intervals (Step S606). The SPS transmission managing unit 221 then transmits SPS data at the shifted SPS communication timings (Step S607).

The SPS transmission managing unit 221 determines if the next communication timing has approached (Step S608). If the next communication timing has not approached yet (No at Step S608), the SPS transmission managing unit 221 waits until the next reception timing approaches.

If the next communication timing has approached (Yes at Step S608), the SPS transmission managing unit 221 changes the schedules of the respective SPS communications to the respective original periodic communication intervals (Step S609).

In the manner explained above, when a plurality of communications are scheduled to occur at the same timing, the radio communication system according to the third embodiment creates communication schedules in which such communication timings of the SPS communications are shifted in advance, and performs communications in accordance with the respective communication schedules. In this manner, when a plurality of communications are scheduled to occur at the same timing, the mobile station can acquire all of the data for each of the SPS communications without switching to the DS. Furthermore, because no additional activation signaling and releasing signaling are transmitted, the amount of signaling can be reduced, compared with that in the first embodiment. Therefore, the radio communications can be stabilized further.

[d] Fourth Embodiment

A fourth embodiment of the present invention will now be explained. A radio communication system according to the fourth embodiment is different from those according to the embodiments and the modification described above in that, when communications are scheduled to occur at the same timing, the communications at that communication timing is achieved via spatially multiplexing. A mobile station and a base station according to the fourth embodiment can also be represented by the block diagrams in FIGS. 1 and 2, respectively. In the explanation hereunder, the configuration and the operation of the units that are the same as those according to the embodiments and the modification thereof will be omitted.

The SPS communication controlling unit 212 in the base station 2 identifies a timing at which a plurality of SPS communication are scheduled to occur simultaneously at the communication intervals for the respective SPS communications acquired from the scheduler 23. The SPS communication controlling unit 212 then notifies the SPS transmission managing unit 221 and the signal generating unit 213 that the spatial multiplexing is to be used at the identified communication timing.

At the communication timing notified by the SPS communication controlling unit 212, the SPS transmission managing unit 221 transmits SPS data for all of the SPS communications using spatial multiplexing.

The signal generating unit 213 uses the RRC signaling to notify the mobile station 1 that the communications are spatially multiplexed at the communication timing notified by the SPS communication controlling unit 212.

The SPS communication controlling unit 112 in the mobile station 1 acquires the communication timing at which communications are spatially multiplexed from the received RRC. The SPS interval controlling unit 111 then notifies the SPS reception managing unit 121 of the timing at which the SPS communications are spatially multiplexed.

At the communication timing notified by the SPS interval controlling unit 111, the SPS reception managing unit 121 spatially multiplexes the SPS communications with the base station 2.

Figure 14:
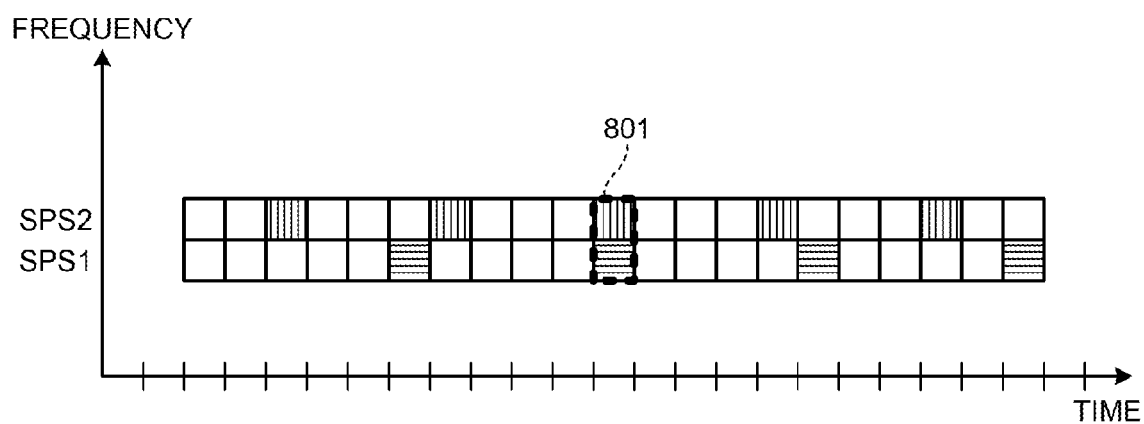
FIG. 14 is a schematic for generally explaining the process performed by a radio communication system according to a fourth embodiment of the present invention when communications are scheduled to occur at the same timing.

Explained now with reference to FIG. 14 is an overall process performed by the radio communication system according to the fourth embodiment when communications are scheduled to occur at the same timing. FIG. 14 is a schematic for generally explaining the process performed by the radio communication system according to the fourth embodiment when communications are scheduled to occur at the same timing. In the explanation hereunder, it is assumed that two SPS communications are scheduled to occur. The denotations in FIG. 14 are the same as those explained with reference to FIG. 4.

Without the spatial multiplexing, the communication SPS1 and the communication SPS2 would occur at the same timing, at a communication timing 801 surrounded by dotted lines. To address this situation, the SPS communication controlling unit 212 in the base station 2 uses the spatial multiplexing to transmit SPS data for SPS1 and SPS2 at the communication timing 801.

The SPS communication controlling unit 212 notifies the SPS transmission managing unit 221 of the communication timing 801 at which the spatial multiplexing is used. The SPS reception managing unit 121 in the mobile station 1 receives the notification of the communication timing 801 at which the spatial multiplexing is used from the SPS communication controlling unit 112. In this manner, the mobile station 1 and the base station 2 are allowed to transmit and to receive data for SPS1 and SPS2 by spatially multiplexing the communications at the communication timing 801.

Figure 15:
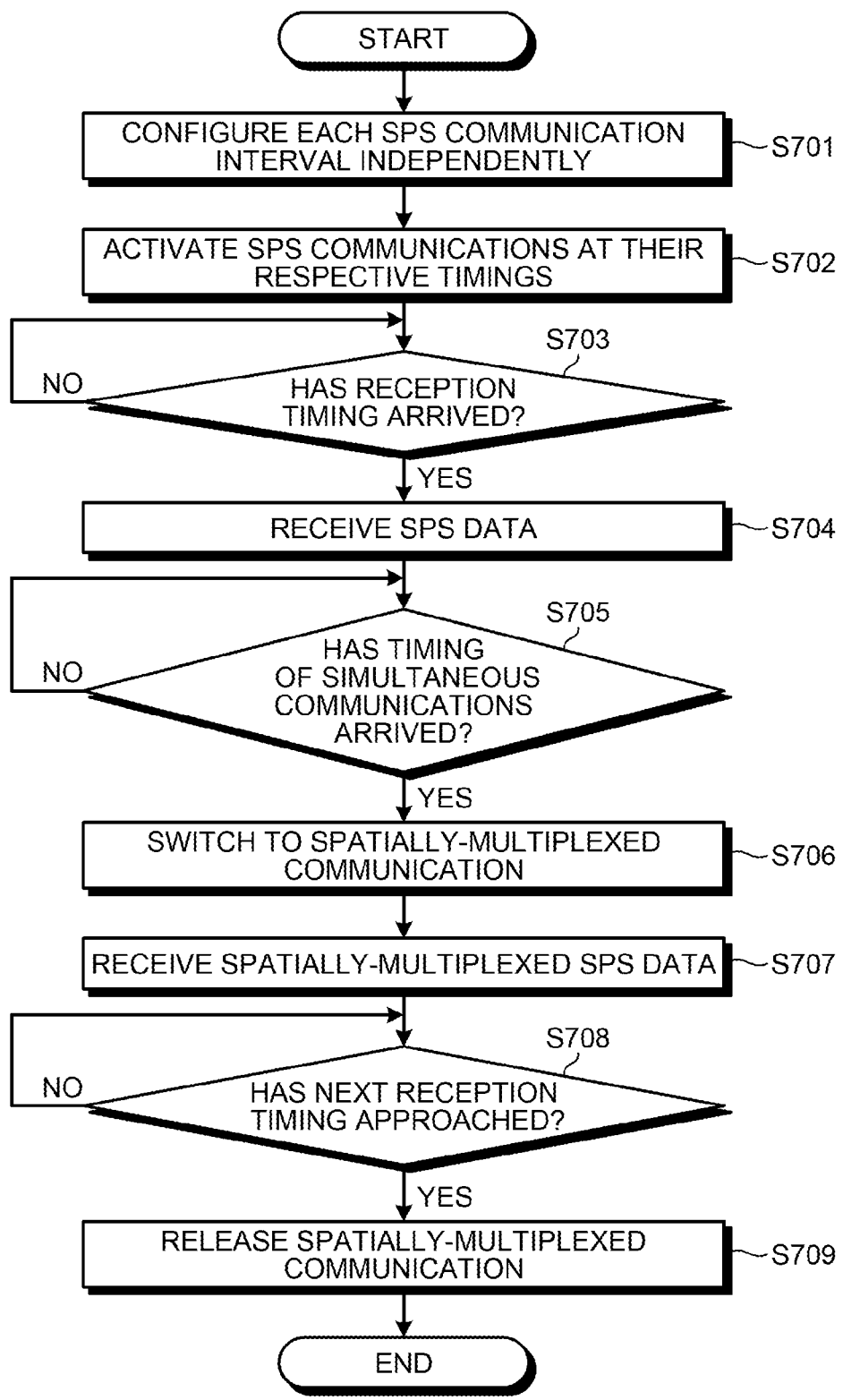
FIG. 15 is a flowchart of a process of resolving scheduled simultaneous communications in the SPS communication performed by the mobile station according to the fourth embodiment.

Explained now with reference to FIG. 15 is a process of resolving scheduled simultaneous communications in the SPS communications performed by the mobile station 1 according to the fourth embodiment. FIG. 15 is a flowchart of a process of resolving scheduled simultaneous communications in the SPS communication performed by the mobile station according to the fourth embodiment.

The SPS interval controlling unit 111 notifies the SPS reception managing unit 121 of the SPS communication intervals notified via the RRC, and configures each of the SPS communication intervals independently (Step S701).

The SPS communication controlling unit 112 receives an activation PDCCH, instructs the SPS reception managing unit 121 to activate the configuration of the SPS communication using the notified radio resource, whereby causing the SPS communications to be activated at their respective timings (Step S702).

The SPS reception managing unit 121 then determines if the timing for receiving SPS data has arrived based on the SPS intervals notified by the SPS interval controlling unit 111 (Step S703). If the reception timing has not arrived yet (No at Step S703), the SPS reception managing unit 121 waits for the reception timing.

If the reception timing has arrived (Yes at Step S703), the SPS reception managing unit 121 receives the SPS data at the communication timings for the respective SPS communications (Step S704).

The SPS reception managing unit 121 determines if the timing of simultaneous communications has arrived (Step S705). If the timing of simultaneous communications has not arrived yet (No at Step S705), the SPS reception managing unit 121 waits until the timing of simultaneous communications arrives.

If the timing of simultaneous communications has arrived (Yes at Step S705), the SPS reception managing unit 121 switches to the communications using the spatial multiplexing (Step S706). At the timing of simultaneous communications, the SPS reception managing unit 121 receives the spatially multiplexed SPS data for the respective SPS communications (Step S707).

The SPS reception managing unit 121 then determines if the next reception timing has approached (Step S708). If the next reception timing has not approached yet (No at Step S708), the SPS reception managing unit 121 waits until the next reception timing approaches.

If the next reception timing has approached (Yes at Step S708), the SPS reception managing unit 121 releases the communications with the spatial multiplexing (Step S709).

Figure 16:
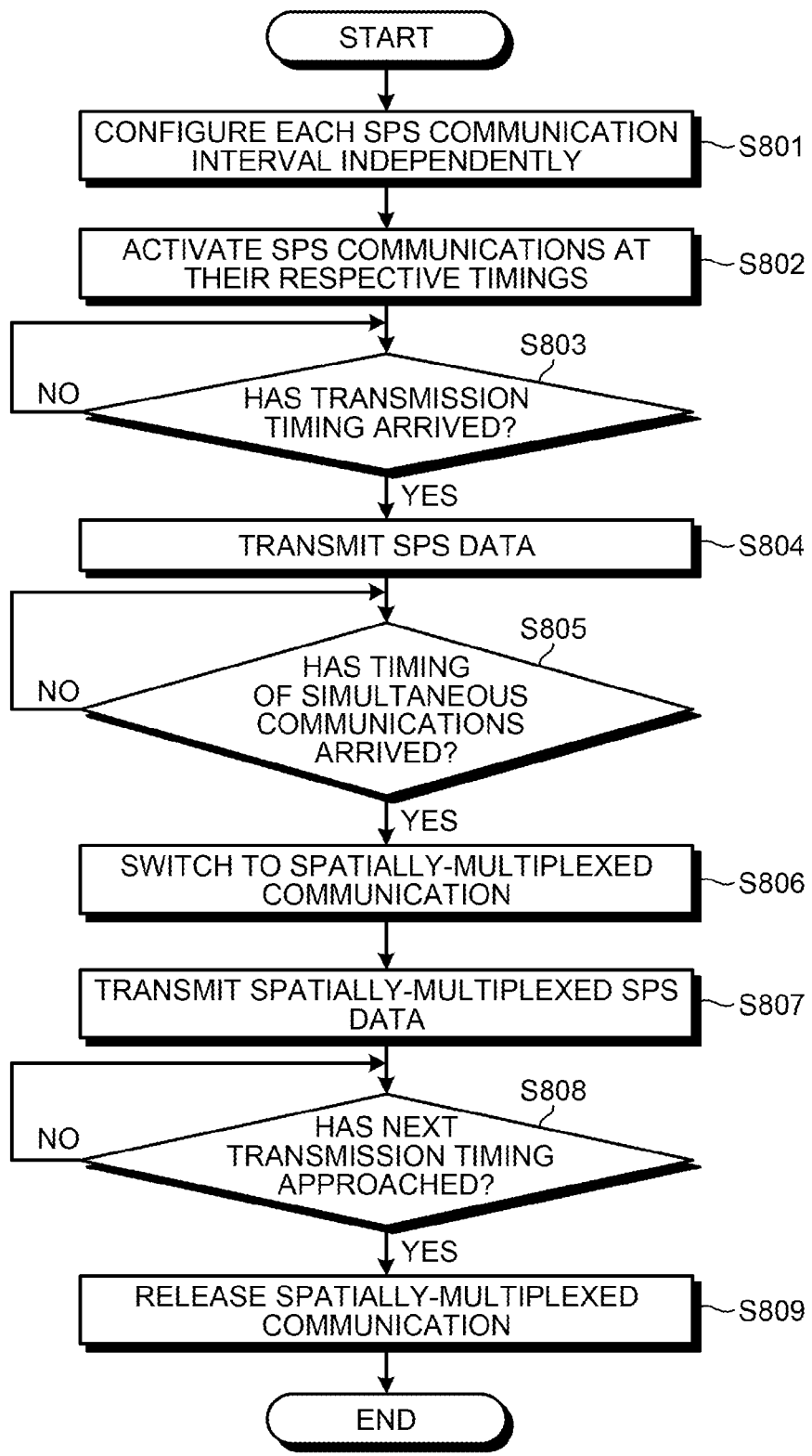
FIG. 16 is a flowchart of a process of resolving scheduled simultaneous communications in the SPS communication performed by the base station according to the fourth embodiment.

Explained now with reference to FIG. 16 is a process of resolving scheduled simultaneous communications in the SPS communications performed by the base station 2 according to the fourth embodiment. FIG. 16 is a flowchart of a process of resolving scheduled simultaneous communications in the SPS communication performed by the base station according to the fourth embodiment.

The SPS interval controlling unit 211 notifies the SPS transmission managing unit 221 of the SPS communication intervals acquired from the scheduler 23. The SPS transmission managing unit 221 then configures each of the SPS communications independently (Step S801).

The SPS communication controlling unit 212 instructs the SPS transmission managing unit 221 to transmit an activation PDCCH for each of the SPS communications. In response to the instruction from the SPS communication controlling unit 212, the SPS transmission managing unit 221 transmits the activation PDCCH to the mobile station 1, whereby causing the respective SPS communications for the mobile station 1 to be activated at their respective timings (Step S802).

The SPS transmission managing unit 221 determines if the timing for transmitting SPS data has arrived based on the SPS intervals notified by the SPS interval controlling unit 211 (Step S803). If the transmission timing has not arrived yet (No at Step S803), the SPS transmission managing unit 221 waits for the transmission timing.

If the transmission timing has arrived (Yes at Step S803), the SPS transmission managing unit 221 transmits SPS data at the transmission timing for the SPS communication (Step S804).

The SPS transmission managing unit 221 determines if the timing of simultaneous communications has arrived (Step S805). If the timing of simultaneous transmissions has not arrived yet (No at Step S805), the SPS transmission managing unit 221 waits until the timing of simultaneous communications arrives.

If the timing of simultaneous communications has arrived (Yes at Step S805), the SPS transmission managing unit 221 switches to the communications using the spatial multiplexing (Step S806). At the timing of simultaneous communications, the SPS transmission managing unit 221 transmits SPS data for each of the SPS communications using the spatial multiplexing (Step S807).

The SPS transmission managing unit 221 then determines if the next communication timing has approached (Step S808). If the next communication timing has not approached yet (No at Step S808), the SPS transmission managing unit 221 waits until the next reception timing approaches.

If the next communication timing has approached (Yes at Step S808), the SPS transmission managing unit 221 releases the spatially multiplexed communications (Step S809).

In the manner explained above, when a plurality of communications are scheduled to occur at the same timing, the radio communication system according to the fourth embodiment performs communications using spatial multiplexing. In this manner, even when a plurality of communications are scheduled to occur at the same timing, the mobile station can acquire all of the data for each of the SPS communications, without switching to the DS. Furthermore, because no additional activation signaling and releasing signaling are transmitted, the amount of signaling can be reduced, compared with that in the first embodiment. Therefore, the radio communications can be stabilized further.

[e] Fifth Embodiment

A fifth embodiment of the present invention will now be explained. A radio communication system according to the fifth embodiment is different from those according to the embodiments and the modification described above in that, when communications are scheduled to occur at the same timing, pieces of SPS data for the respective SPS communications at that communication timing is bundled into one transport block. Hereinafter, the transport block is abbreviated as "TB". A mobile station and a base station according to the fifth embodiment can also be represented by the block diagrams in FIGS. 1 and 2, respectively. In the explanation hereunder, the configuration and the operation of the units that are the same as those according to the embodiments and the modification thereof will be omitted.

The SPS communication controlling unit 212 in the base station 2 identifies a timing at which a plurality of SPS communication are scheduled to occur at the same timing at the communication intervals for the respective SPS communications acquired from the scheduler 23. The SPS communication controlling unit 212 then notifies the SPS transmission managing unit 221 and the signal generating unit 213 that the pieces of SPS data for the respective SPS communications at the identified communication timing is to be transmitted in one TB.

The SPS transmission managing unit 221 transmits the TB into which the pieces of SPS data for the respective SPS communications are bundled to the mobile station 1, at the communication timing notified by the SPS communication controlling unit 212.

The signal generating unit 213 uses RRC signaling to notify the mobile station 1 that the communication using one TB is to be performed at the communication timing notified by the SPS communication controlling unit 212. The signal generating unit 213 generates a signal in which pieces of SPS data for the respective SPS communications are encapsulated into one TB, and transmits the TB to the SPS transmission managing unit 221 at the communication timing notified by the SPS communication controlling unit 212.

The SPS communication controlling unit 112 in the mobile station 1 acquires the communication timing at which the communication using one TB is to be performed from the received RRC signaling. The SPS interval controlling unit 111 notifies the SPS reception managing unit 121 of the communication timing at which the communication using one TB is to be performed in the SPS communications.

The SPS reception managing unit 121 performs communications using one TB with the base station 2 at the communication timing notified by the SPS interval controlling unit 111.

Figure 17:
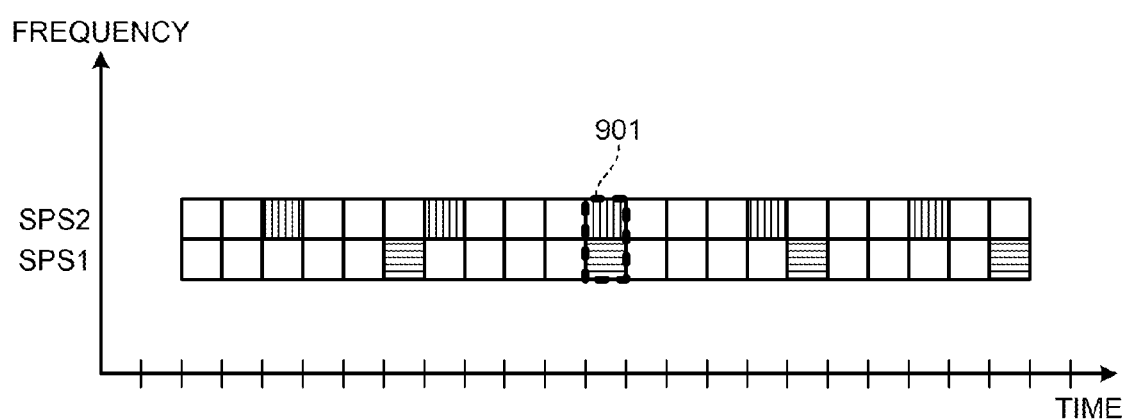
FIG. 17 is a schematic for generally explaining the process performed by a radio communication system according to a fifth embodiment of the present invention when communications are scheduled to occur at the same timing.

Explained now with reference to FIG. 17 is an overall process performed by the radio communication system according to the fifth embodiment when communications are scheduled to occur at the same timing. FIG. 17 is a schematic for generally explaining the process performed by the radio communication system according to the fifth embodiment when communications are scheduled to occur at the same timing. In the explanation hereunder, it is assumed that two SPS communications are scheduled to occur. The denotations in FIG. 17 are the same as those explained with reference to FIG. 4.

Without bundling the communication into one TB, the communication SPS1 and the communication SPS2 would occur simultaneously, at a communication timing 901 surrounded by dotted lines. To address this situation, the SPS communication controlling unit 212 in the base station 2 transmits the SPS data for both SPS1 and SPS2 in one TB at the communication timing 901.

The SPS communication controlling unit 212 then notifies the SPS transmission managing unit 221 of the communication timing 901 at which the communication using one TB is to be performed. The SPS reception managing unit 121 in the mobile station 1 is notified by the SPS communication controlling unit 112 of the communication timing 901 at which the communication using one TB is performed. In this manner, the mobile station 1 and the base station 2 can transmit and receive SPS data for SPS1 and SPS2 by performing communications using one TB at the communication timing 901.

Figure 18:
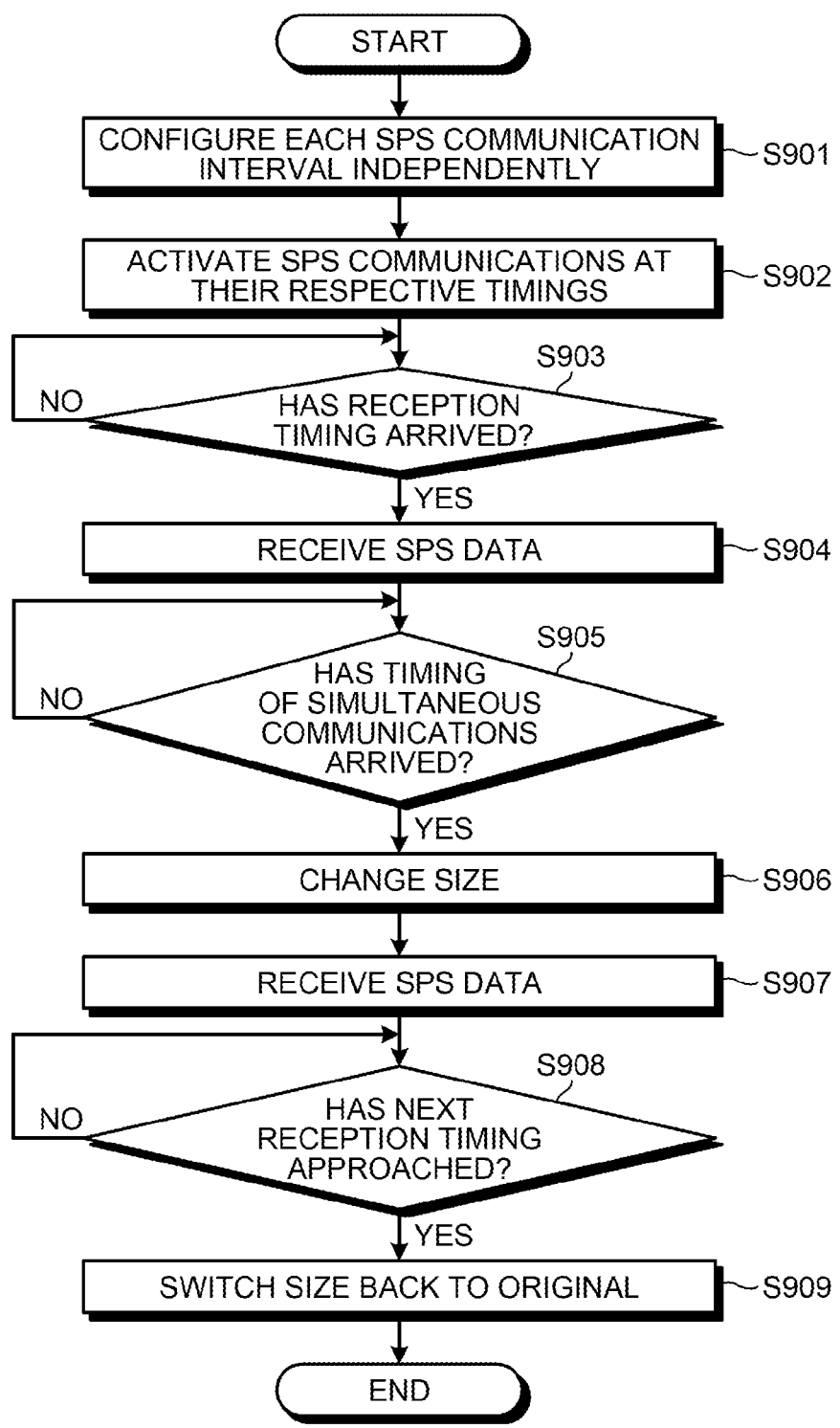
FIG. 18 is a flowchart of a process of resolving scheduled simultaneous communications in the SPS communication performed by the mobile station according to the fifth embodiment.

Explained now with reference to FIG. 18 is a process of resolving scheduled simultaneous communications in the SPS communications performed by the mobile station 1 according to the fifth embodiment. FIG. 18 is a flowchart of the process of resolving scheduled simultaneous communications in the SPS communication performed by the mobile station according to the fifth embodiment.

The SPS interval controlling unit 111 notifies the SPS reception managing unit 121 of each of the SPS communication intervals notified via RRC, and configures each of the SPS communication intervals independently (Step S901).

The SPS communication controlling unit 112 receives an activation PDCCH, and instructs the SPS reception managing unit 121 to activate the configurations of the SPS communication using the notified radio resource, whereby causing the SPS communications to be activated at their respective timings (Step S902).

The SPS reception managing unit 121 determines if the timing for receiving SPS data has arrived based on the SPS intervals notified by the SPS interval controlling unit 111 (Step S903). If the reception timing has not arrived yet (No at Step S903), the SPS reception managing unit 121 waits for the reception timing.

If the reception timing has arrived (Yes at Step S903), the SPS reception managing unit 121 receives the SPS data at the communication timings for the respective SPS communications (Step S904).

The SPS reception managing unit 121 then determines if the timing of simultaneous communications has arrived (Step S905). If the timing of simultaneous communication has not arrived yet (No at Step S905), the SPS reception managing unit 121 waits until the timing of simultaneous communications arrives.

If the timing of simultaneous communications has arrived (Yes at Step S905), the SPS reception managing unit 121 changes the size of data to be received to the size of the TB (Step S906). The SPS reception managing unit 121 then receives the pieces of SPS data of the respective SPS communications in one TB at the timing of simultaneous communications (Step S907). The SPS reception managing unit 121 then acquires the pieces of SPS data for the respective SPS communications from the received TB.

The SPS reception managing unit 121 then determines if the next reception timing has approached (Step S908). If the next reception timing has not approached yet (No at Step S908), the SPS reception managing unit 121 waits until the next reception timing approaches.

If the next reception timing has approached (Yes at Step S908), the SPS reception managing unit 121 changes the size of data to be received to the original size (Step S909).

Figure 19:
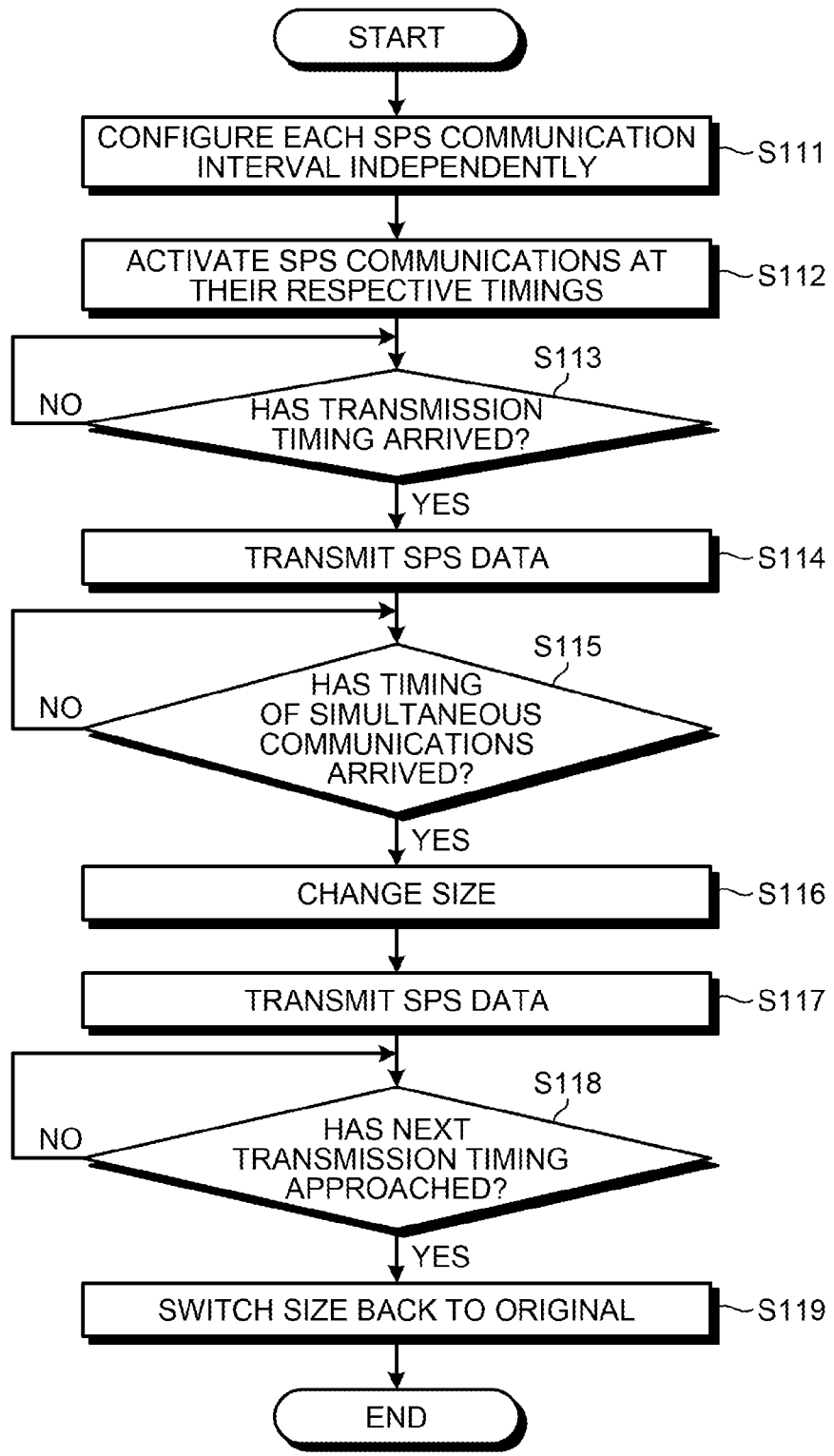
FIG. 19 is a flowchart of a process of resolving scheduled simultaneous communications in the SPS communication performed by the base station according to the fifth embodiment.

Explained now with reference to FIG. 19 is a process of resolving scheduled simultaneous communications in the SPS communications performed by the base station 2 according to the fifth embodiment. FIG. 19 is a flowchart of a process of resolving scheduled simultaneous communications in the SPS communication performed by the base station according to the fifth embodiment.

The SPS interval controlling unit 211 notifies the SPS transmission managing unit 221 of the SPS communication intervals acquired from the scheduler 23. The SPS transmission managing unit 221 then configures each of the SPS communications independently (Step S111).

The SPS communication controlling unit 212 instructs the SPS transmission managing unit 221 to transmit an activation PDCCH for each of the SPS communications. In response to the instruction from the SPS communication controlling unit 212, the SPS transmission managing unit 221 transmits the activation PDCCH to the mobile station 1, whereby causing the respective SPS communications for the mobile station 1 to be activated at their respective timings (Step S112).

The SPS transmission managing unit 221 then determines if the timing for transmitting SPS data has arrived based on the SPS intervals notified by the SPS interval controlling unit 211 (Step S113). If the transmission timing has not arrived yet (No at Step S113), the SPS transmission managing unit 221 waits for the transmission timing.

If the transmission timing has arrived (Yes at Step S113), the SPS transmission managing unit 221 transmits SPS data at the communication timing for the SPS communication (Step S114).

The SPS transmission managing unit 221 then determines if the timing of simultaneous communications has arrived (Step S115). If the timing of simultaneous communication has not arrived yet (No at Step S115), the SPS transmission managing unit 221 waits until the timing of simultaneous communications arrives.

If the timing of simultaneous communications has arrived (Yes at Step S115), the SPS transmission managing unit 221 changes the size of data to be communicated to the size of the TB (Step S116). The SPS transmission managing unit 221 then transmits the TB including the pieces of SPS data for the respective SPS communications at the timing of simultaneous communications (Step S117).

The SPS transmission managing unit 221 then determines if the next communication timing has approached (Step S118). If the next communication timing has not approached yet (No at Step S118), the SPS transmission managing unit 221 waits until the next reception timing approaches.

If the next communication timing has approached (Yes at Step S118), the SPS transmission managing unit 221 changes the size of data to be transmitted to the original size (Step S119).

In the manner explained above, when a plurality of communications are scheduled to occur at the same timing, the radio communication system according to the fifth embodiment encapsulates the pieces of SPS data for the respective SPS communications into one transport blocks before performing the communications. In this manner, even when a plurality of communications are scheduled to occur at the same timing, the mobile station can acquire all of the data for each of the SPS communications. Furthermore, because no additional activation signaling and releasing signaling are transmitted, the amount of signaling can be reduced, compared with that in the first embodiment. Therefore, the radio communications can be stabilized further.

Hardware Configurations

Figure 20:
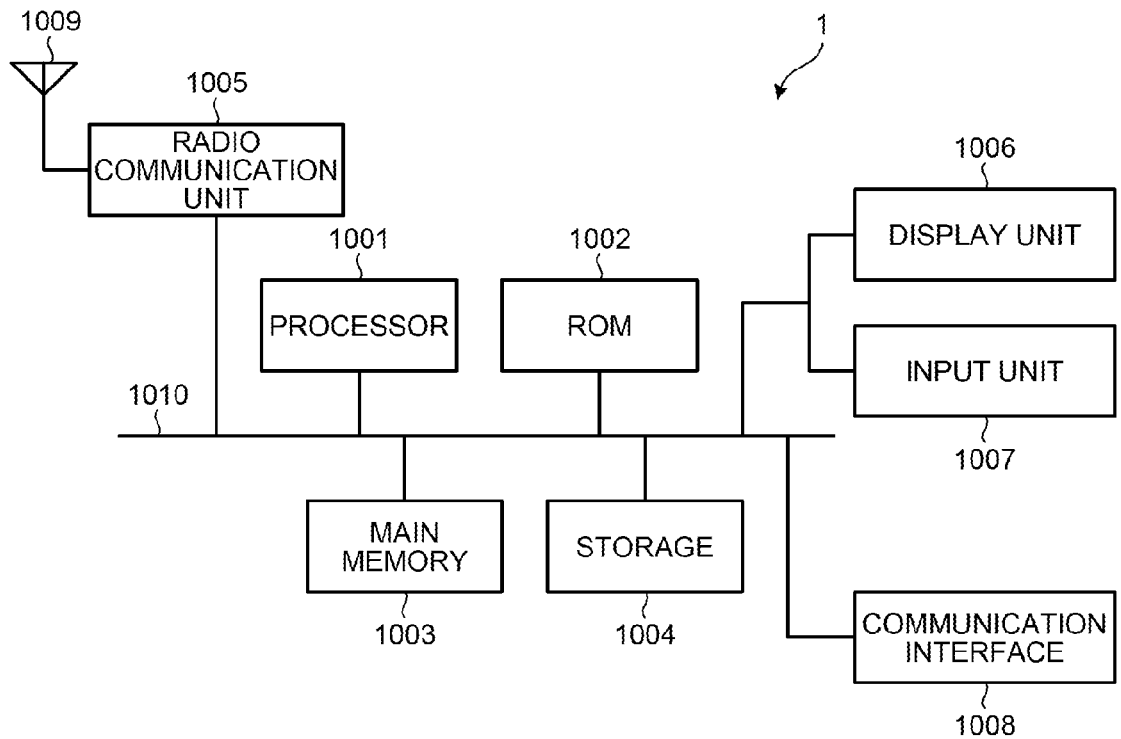
FIG. 20 is a schematic of a hardware configuration of the mobile station.
Figure 21:
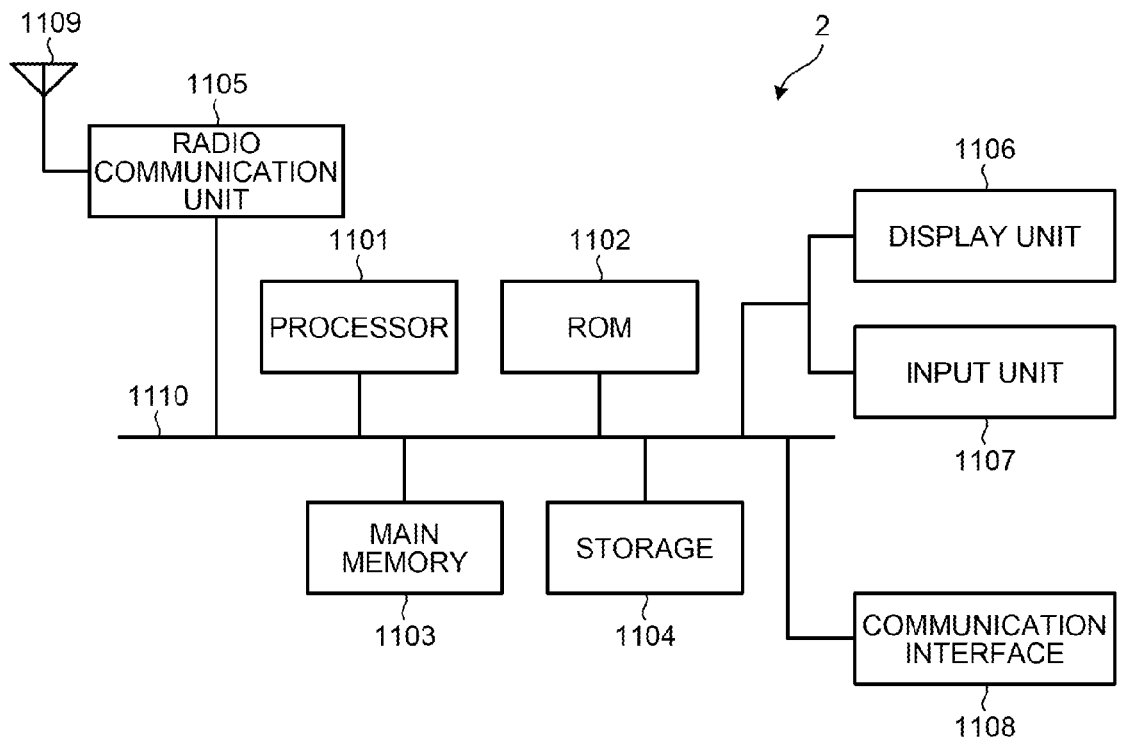
FIG. 21 is a schematic of a hardware configuration of the base station.

Hardware configurations of the mobile station 1 and the base station 2 according to the embodiments and the modification will now be explained. FIG. 20 is a schematic of a hardware configuration of the mobile station. FIG. 21 is a schematic of a hardware configuration of the base station.

As illustrated in FIG. 20, the mobile station 1 includes a processor 1001, a read-only memory (ROM) 1002, a main memory 1003, a storage 1004, a radio communication unit 1005, a display unit 1006, an input unit 1007, a communication interface 1008, and an antenna 1009.

Each of the ROM 1002, the main memory 1003, the storage 1004, the radio communication unit 1005, the display unit 1006, the input unit 1007, and the communication interface 1008 is connected to the processor 1001 via a bus 1010.

The display unit 1006 is a liquid crystal display, for example. The input unit 1007 is a keypad, for example. An operator of the mobile station 1 performs an operation such as entering a phone number or the like using the display unit 1006 and the input unit 1007.

The communication interface 1008 is a speaker or a microphone, for example. An operator of the mobile station 1 performs an operation of transmitting and receiving voice using the communication interface 1008.

The antenna 1009 is connected to the radio communication unit 1005. The radio communication unit 1005 and the processor 1001 implement the function of the transceiver 11 illustrated in FIG. 1.

The ROM 1002 stores therein computer programs for executing various processes performed by the control plane 110, the data plane 120, and the uplink transmitter 13, for example. The processor 1001 then reads the various computer programs stored in the ROM 1002, loads the computer programs onto the main memory 1003, and generates and executes processes each performing a corresponding process.

The processor 1001, the ROM 1002, the main memory 1003, and the storage 1004 implement each of the functions achieved by the control plane 110, the data plane 120, and the uplink transmitter 13 illustrated in FIG. 1, for example.

As illustrated in FIG. 21, the base station 2 includes a processor 1101, a ROM 1102, a main memory 1103, a storage 1104, a radio communication unit 1105, a display unit 1106, an input unit 1107, a communication interface 1108, and an antenna 1109.

Each of the ROM 1102, the main memory 1103, the storage 1104, the radio communication unit 1105, the display unit 1106, the input unit 1107 and the communication interface 1108 is connected to the processor 1101 via a bus 1110.

The display unit 1106 is a monitor, for example. The input unit 1107 is a keyboard, for example. An operator of the base station 2 performs an operation such as entering a phone number or the like using the display unit 1106 and the input unit 1107.

The communication interface 1108 is an interface for communicating with a higher-level station, for example. Specifically, the communication interface 1108 is a network board or an analog-to-digital converter (ADC), for example. The communication interface 1108 and the processor 1101 implement the function of the higher level station transceiver 21 illustrated in FIG. 2, for example.

The antenna 1109 is connected to the radio communication unit 1105. The radio communication unit 1105 and the processor 1101 implement the function of the transceiver 24 illustrated in FIG. 2.

The storage 1104 is a storage device such as a hard disk.

The ROM 1102 stores therein computer programs for executing various processes performed by the control plane 210, the data plane 220, and the scheduler 23, for example. The processor 1101 then reads the various computer programs stored in the ROM 1102, loads the computer programs onto the main memory 1103, and generates and executes processes each performing a corresponding process.

The processor 1101, the ROM 1102, the main memory 1103, and the storage 1104 implement each of the functions achieved by the control plane 210, the data plane 220, and the scheduler 23 illustrated in FIG. 2, for example.

A radio communication system, a mobile station, base station, and a method for controlling a radio communication system according one aspect of the present invention have an advantageous effect of continuing SPS communications even when SPS communications are scheduled to occur at the same timing.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication system comprising:
a base station; and
a mobile station, wherein
the base station comprises
a communication unit that executes a plurality of Semi-Persistent Scheduling (SPS) communications with the mobile station at respective periodic communication intervals, and
a control unit that changes, when the SPS communications are scheduled to occur at a same communication time, communication configurations by shifting a communication time of each of all or some of the SPS communications to a prior or subsequent subframe of the same communication timing, and
the mobile station comprises a communication control unit that performs the SPS communications with the base station using the communication configurations changed by the control unit.

2. The radio communication system according to claim 1, wherein
the control unit comprises:
a communication configuration notifying unit that notifies the mobile station of communication configurations including periodic communication intervals for the respective SPS communications; and
a control signal transmitting unit that transmits a control signal for changing the communication configurations scheduled at the same communication time when the communication intervals notified by the communication configuration notifying unit cause the SPS communications to occur at the same time, and
the communication control unit comprises:
a configuration controlling unit that changes the communication configurations scheduled at the same communication time in response to the control signal transmitted by the control signal transmitting unit, among the communication configurations notified by the communication configuration notifying unit; and
a data transceiving unit that transmits and receives data to and from the base station using the communication configurations changed by the configuration controlling unit.

3. The radio communication system according to claim 2, wherein the data transceiving unit uses semi-persistent scheduling for communications performed at the periodic communication intervals that are notified by the communication configuration notifying unit.

4. The radio communication system according to claim 2, wherein
the control signal transmitting unit transmits a control signal for designating communication times to avoid simultaneous communications, and
the configuration controlling unit shifts the communication times causing the communications to occur at the same time to the respective communication times designated by the control signal transmitted by the control signal transmitting unit so as to resolve simultaneous communications.

5. The radio communication system according to claim 2, wherein
the control signal transmitting unit designates the communication times causing the communications to occur at the same time, other than a predetermined communication time, in such a manner that the communications do not occur at the same time with the predetermined communication time or at the same time with one another, and
the configuration controlling unit shifts the communication times causing the communications to occur at the same time to the respective communication times designated by the control signal transmitted by the control signal transmitting unit.

6. The radio communication system according to claim 5, wherein the communication configuration notifying unit determines the predetermined communication time based on Quality of Service (QoS) of data.

7. The radio communication system according to claim 2, wherein the communication configuration notifying unit notifies radio resources including at least one of a transmission power, a modulation encoding scheme, a control signal masking method, frequencies to be used, and time as the communication configurations.

8. The radio communication system according to claim 1, wherein
the control unit comprises:
a communication timing correcting unit that shifts the communication times causing the SPS communications to occur at the same time when the SPS communications are scheduled to occur at the same communication time so as to correct communication times; and
a communication timing notifying unit that notifies the mobile station of the communication times for the respective SPS communications corrected by the communication timing correcting unit, and the communication control unit comprises:
- a communication timing acquiring unit that receives the notification of the communication times corrected by the communication timing correcting unit from the communication timing notifying unit and acquires the communication times; and
- a data transceiving unit that transmits and receives data to and from the base station at the respective communication times acquired by the communication timing acquiring unit.

9. The radio communication system according to claim 1, wherein, when the SPS communications are scheduled to occur at the same communication time, the control unit uses spatial multiplexing to resolve simultaneous communications.

10. The radio communication system according to claim 1, wherein, when the SPS communications are scheduled to occur at the same communication time, the control unit bundles pieces of data to be transmitted at the same communication time to generate one data block and transmits the data using the generated data block so as to resolve simultaneous communications.

11. A mobile station comprising:
a communication control unit that performs communications with a base station, when a plurality of Semi-Persistent Scheduling (SPS) communications with the base station at respective periodic communication intervals are scheduled to occur at a same communication time, while changing the communication configurations by shifting a communication time of each of all or some of the communications to a prior or subsequent subframe of the same communication time causing the SPS communications to occur at the same communication time under control of the base station.

12. A base station comprising
- a communication unit that executes a plurality of Semi-Persistent Scheduling (SPS) communications with the mobile station at respective periodic communication intervals, and
- a control unit that changes, when the SPS communications are scheduled to occur at a same communication time, communication configurations by shifting a communication time of each of all or some of the SPS communications to a prior or subsequent subframe of the same communication time.

13. A method for controlling a radio communication system including a base station and a mobile station, the method comprising:
- executing a plurality of Semi-Persistent Scheduling (SPS) communications with the mobile station at respective periodic communication intervals, by base station;
- changing, when the SPS communications with the mobile station at respective periodic communication intervals are scheduled to occur at a same communication time communication configurations by shifting a communication time of each of all or some of the SPS communications to a prior or subsequent subframe of the same communication time, by base station; and
- performing, by the mobile station, the communications with the base station using the communication configurations changed by the base station.

* * * * *